(12) United States Patent
Fujita et al.

(10) Patent No.: US 7,457,513 B2
(45) Date of Patent: Nov. 25, 2008

(54) RECORDER/REPRODUCER

(75) Inventors: Kouji Fujita, Yokohama (JP); Hideo Nishijima, Yokohama (JP); Motoyoshi Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 11/124,234

(22) Filed: May 9, 2005

(65) Prior Publication Data

US 2005/0201721 A1 Sep. 15, 2005

Related U.S. Application Data

(63) Continuation of application No. 09/623,560, filed as application No. PCT/JP99/02181 on Apr. 23, 1999, now Pat. No. 6,987,924.

(30) Foreign Application Priority Data

Apr. 23, 1999 (JP) ................. 10/117253

(51) Int. Cl.
  *H04N 7/00* (2006.01)
(52) U.S. Cl. ....................... 386/46; 386/105
(58) Field of Classification Search ............. 386/46, 386/83, 95, 96, 100, 125; 725/32, 42; 358/908
See application file for complete search history.

(56) References Cited

U.S. PATENT DOCUMENTS 5,134,499 A * 7/1992 Sata et al. .................. 386/109
5,479,302 A   12/1995 Haines
5,692,093 A * 11/1997 Iggulden et al. ............. 386/46
2002/0129374 A1   9/2002 Freeman

FOREIGN PATENT DOCUMENTS

| JP | 5-250762 | 9/1993 |
|----|----------|--------|
| JP | 8-140040 | 5/1996 |
| JP | 9-9196 | 1/1997 |
| JP | 9-160753 | 6/1997 |
| JP | 9-284706 | 10/1997 |
| JP | 09-284706 | 10/1997 |
| JP | 10-92107 | 4/1998 |
| JP | 11-504175 | 4/1999 |
| WO | WO 96/33579 | 10/1996 |

* cited by examiner

*Primary Examiner*—Robert Chevalier
(74) *Attorney, Agent, or Firm*—Antonelli, Terry, Stout & Kraus, LLP

(57) ABSTRACT

A recorder/reproducer for recording and reproducing signals includes a receiver which receives signals, a first recorder which records the signals received by the receiver on a first recording medium, and a first reproducer which reproduces the signals recorded on the first recording medium. A second recorder is provided which records the signals reproduced by the first reproducer on a second recording medium, a detector is provided which detects a commercial message portion from the signals recorded on the second recording medium, and a second reproducer is provided which reproduces the signals recorded on the second recording medium while excluding the commercial message portion detected by the detector.

6 Claims, 18 Drawing Sheets

RECORDER/REPRODUCER

CROSS REFERENCE TO RELATED APPLICATION

This is a continuation application of U.S. application Ser. No. 09/623,560, filed Nov. 1, 2000, now U.S. Pat. No. 6,987,924 which is a 371 of PCT/JP99/02181, filed Apr. 23, 1999, the contents of which are incorporated by reference herein.

TECHNICAL FIELD

The present invention relates to a recorder/reproducer capable of simultaneously making recording/reproduction and other signal processings.

The present invention particularly relates to a digital recorder/reproducer that can simultaneously and independently make digital time-base compression/expansion of a video signal, an audio signal and an information signal and record/reproduce those processed signals on or from a plurality of recording media.

BACKGROUND ART

In a home recorder/reproducer such as a digital recorder/reproducer (for example, a digital VTR), video and audio signals are digitized in order to consume a small amount of tape consumption and to record for a long time, and they are further coded at a high efficiency to reduce the amount of data.

For example, the now commercialized home digital VTR compresses the amount of video signal to about ⅕ (approximately 25 M bps), and then records the compressed data on a magnetic tape. The video and audio signals, after being digitized, can be recorded with high quality.

The techniques for recording information of such compressed digital video and audio signals on a magnetic tape or magnetooptical disk are disclosed in JP-A-9-160753.

In addition, another home VTR that discriminates the commercials from a current television broadcast and reproduces them for quick seeing has been manufactured. This VTR is disclosed in, for example, JP-A-5-250762, and further improved in its usability.

DISCLOSURE OF INVENTION

However, in order that the signal recorded in the past is reproduced in the normal mode and special mode while a real time input signal of a video signal or the like is being recorded, by use of the home digital VTR mentioned above or home analog VTR (for example, VHS-VTR, 8-mm VTR), it is necessary to provide a plurality of recording and/or reproducing apparatus.

In the home VTR capable of reproducing the commercials for quick seeing, since the switching points of the commercials were discriminated by the audio mode, the accuracy at which the commercial switching points were discriminated was low, and the portions left after cutting off the commercials could not be reproduced.

It is an object of the invention to provide a recorder/reproducer with the above problems solved, and in which, when a signal is being recorded/reproduced on or from a recording medium such as tape, another signal can be recorded/reproduced or processed.

Particularly, it is an object of the invention to provide a digital recorder/reproducer capable of recording a video signal, audio signal and information signal, and at the same time reproducing the previously recorded signal in the normal mode and special mode. It is another object of the invention to provide a digital recorder/reproducer capable of actualizing the performance such as the reproduction and recording of a broadcast signal with the commercials cut off by predicting the beginning points and closing points of the commercials of the television broadcast at the time of reproduction or recording, and further capable of being improved in its usability.

According to the invention, in order to achieve the above objects, there is provided a recorder/reproducer having input means through which a first signal is fed, first recorder/reproducer means for recording the first signal on a first recording medium and reproducing the first signal from the first recording medium, second recorder/reproducer means for recording the first signal reproduced by the first recorder/reproducer means on a second recording medium, and reproducing the first signal from the second recording medium, output means for supplying the first signal reproduced by the second recorder/reproducer means, and control means for controlling the processing of the signals, this control means, when the first recorder/reproducer means starts to record the first signal at a first time and ends to record it at a second time, controlling the second recorder/reproducer means to delay the first signal a predetermined time from the second time and to start recording the first signal from a third time ahead of the second time. Thus, the fed signal can be delayed a certain time, and recorded on the recording medium.

In the recorder/reproducer, signal processor means is further provided for making a certain process on the second signal during the interval from the first time to the third time. Thus, during the delayed time, other processing can be made.

In the recorder/reproducer, the amount of information the first and/or second recorder/reproducer means can record or reproduce per unit time is made larger than that of the first signal fed to the input means per unit time. Thus, the first and/or second recorder/reproducer means can make other processing than the processing of the input signal.

In the recorder/reproducer, compressor means is further provided for compressing the first signal at a predetermined compression ratio or buffer means is further provided to be connected to the first recorder/reproducer means to accumulate signal information until a certain amount of information is accumulated, and then supplying the accumulated information, and the control means controls the second recorder/reproducer means to end recording the first signal at a fourth time so that a second time interval from the third time to the fourth time can be reduced relative to a first time interval from the first time to the second time. Thus, the time for recording process can be reduced.

In the recorder/reproducer, the control means controls either the first recorder/reproducer means or the second recorder/reproducer means to record or reproduce the first signal at each of a plurality of times into which the time interval from the third time to the second time is divided. Thus, recording and reproduction can be apparently simultaneously performed.

In the recorder/reproducer, the second recording medium is a tape-like recording medium and the first recording medium is a disk-like recording medium or semiconductor memory. Thus, the second recording medium can record a large amount of information, while the first recording medium can be accessed in a short access time.

In the recorder/reproducer, the first recorder/reproducer means makes access to a certain amount of signal in a shorter access time than the second recorder/reproducer means. Thus, as compared with the second recorder/reproducer means, the first recorder/reproducer means can make processing faster. For example, even though the second recording medium is a tape-like recording medium that takes a long access time, the first recorder/reproducer means that can access in a short time can compensate for this defect, and make useful the advantage of the tape-like recording medium capable of recording a large amount of information.

In the recorder/reproducer, the second signal is the first signal fed to the input means as a broadcast program, and the signal processor means makes the certain process for discriminating commercials included in the broadcast program from the program itself. Thus, the commercials can be discriminated from the program itself during the delayed time.

In the recorder/reproducer, when the first signal fed to the input means is a compressed signal, the signal processor means expands the compressed signal, and then discriminates the commercials from the program itself. Thus, the commercials in the signal after being expanded to the actual time interval can be discriminated from the program itself.

In the recorder/reproducer, the first signal reproduced from the first recorder/reproducer means is a compressed signal, the compressed signal includes a time stamp signal as time information at every certain times, the signal processor means expands the compressed signal in such a manner as to include the time stamp signal, and specifies the commercials in association with the time stamp signal, and the control means controls the second recorder/reproducer means to record the compressed first signal while removing the commercials or adding positional information of the commercials by use of the results from the signal processor means that specifies the commercials on the basis of the time stamp signal. Thus, the commercials can be removed, and the commercial information can be added to the compressed data.

In the recorder/reproducer, the signal processor means makes the certain process for another signal, as the second signal different from the first signal, that the second recorder/reproducer means records or reproduces. Thus, even when the first signal is fed to the input means, another signal can be processed.

In the recorder/reproducer, the broadcast program includes video information and audio information, and the signal processor means detects variable points at which the video information and/or audio information cause certain changes, and discriminates the commercials from the program itself by use of time intervals in which the changes occur. Thus, the commercials can be discriminated from the program itself by use of the time intervals in which the changes of video and audio information occur.

In the recorder/reproducer, the control means controls the second recorder/reproducer means to record the first signal while removing the commercials by use of the results from the signal processor means that discriminates the commercials from the program itself. Thus, the signal with the commercials removed can be recorded on the recording medium.

In the recorder/reproducer, the control means controls the second recorder/reproducer means to record the first signal and information of the results from the signal processor means that discriminates the commercials from the program itself, together on the second recording medium. Thus, since the commercial information is recorded on the recording medium, the commercial information can be referred to at the time of reproduction.

In the recorder/reproducer, when the second recorder/reproducer means records the first signal, the control means controls information of the result from the signal processor means that discriminates the commercials from the program itself to be stored in commercial information storage means. Thus, the commercial information can be obtained referring to the commercial information storage means.

In the recorder/reproducer, the control means controls said first recorder/reproducer means to process at each of a plurality of signal sections into which the signal fed to the input means is divided. Thus, even though the capacity of the first recording medium is small, the input signal can be processed.

There is also provided a recorder/reproducer for recording and reproducing signals, having third recorder/reproducer means for reproducing a third signal from a third recording medium, fourth recorder/reproducer means for recording the third signal reproduced by the third recorder/reproducer means on a fourth recording medium, and reproducing the third signal from the fourth recording medium, output means for supplying the third signal reproduced by the fourth recorder/reproducer means, and control means for controlling the processing of the signals, wherein when the third recorder/reproducer means starts to reproduce the third signal at a fifth time and ends the reproduction at a sixth time, the control means controls the output means to start supplying the third signal at a seventh time that is delayed a certain time from the fifth time and ahead of the sixth time. Thus, the time at which data is produced can be delayed relative to the time at which data is reproduced.

In the recorder/reproducer, signal processor means is further provided for making a predetermined process on a fourth signal in the time interval from the fifth time to the seventh time. Thus, other processing can be made during the delayed time.

In the recorder/reproducer, the amount of information the fourth recorder/reproducer means can record or reproduce per unit time is larger than the amount of information of the third signal the third recorder/reproducer means reproduces per unit. Thus, the fourth recording medium can be recorded and reproduced.

In the recorder/reproducer, the control means controls the fourth recorder/reproducer means to record the third signal reproduced by the third recorder/reproducer means and reproduce the recorded fourth signal from the fourth recording medium during the interval from the seventh time to the sixth time.

In the recorder/reproducer, the control means controls the fourth recorder/reproducer means to record the third signal reproduced by the third recorder/reproducer means or reproduce the recorded fourth signal from the fourth recording medium at each of a plurality of time sections into which the time interval from the seventh time to the sixth time is divided. Thus, recording and reproduction can be apparently simultaneously carried out.

In the recorder/reproducer, the third recording medium is a tape-like recording medium, and the fourth recording medium is a disk-like recording medium or semiconductor memory. Thus, a large amount of information can be recorded on the third recording medium, and the fourth recording medium can be accessed in a short access time.

In the recorder/reproducer, the access time in which the fourth recorder/reproducer means makes access to a certain amount of signal is shorter than the third recorder/reproducer means. Thus, the fourth reorder/reproducer means can make faster processing than the third recorder/reproducer means. For example, even though the third recording medium is a tape-like recording medium that takes a long access time, the fourth recorder/reproducer means that makes processing in a short access time can compensate for this defect, and make useful the advantage of the tape-like recording medium that can record a large amount of information.

In the recorder/reproducer, the third signal reproduced by the third recorder/reproducer means is a broadcast program, and the signal processor means receives the third signal reproduced by the third recorder/reproducer means as the fourth signal, and makes the predetermined process on the fourth signal so that commercials included in the broadcast program can be discriminated from the program itself. Thus, the commercials can be discriminated from the program itself during the delayed time.

In the recorder/reproducer, when the third signal reproduced by the third recorder/reproducer means is a compressed signal, the signal processor means expands the compressed signal, and then discriminates the commercials from the program itself. Thus, the commercials in the signal after being expanded to the actual time intervals can be discriminated from the program itself.

In the recorder/reproducer, the third signal reproduced by the third recorder/reproducer means is a compressed signal including a time stamp signal as time information at every predetermined times, the signal processor means expands the compressed signal in such a manner as to include the time stamp signal, and specifies the commercials according to the time stamp signal, and the control means controls the fourth recorder/reproducer means to reproduce the third compressed signal while excluding the commercials by use of the results from the signal processor means that discriminates the commercials from the program itself on the basis of the time stamp signal. Thus, the commercials can be removed, and the commercial information can be added to the compressed data.

In the recorder/reproducer, the broadcast program includes video information and audio information, and the signal processor means detects variable points at which the video information and/or the audio information cause certain changes, and discriminates the commercials from the program itself by use of time intervals in which the changes occur. Thus, the commercials can be discriminated from the program itself by use of the time intervals in which the changes of video and audio information occur.

In the recorder/reproducer, the control means controls the fourth recorder/reproducer means to reproduce the third signal while removing the commercials by use of the results from the signal processor means that discriminates the commercials from the program itself. Thus, the signal with the commercials removed can be recorded on the recording medium.

In the recorder/reproducer, the control means controls said fourth recorder/reproducer means at each of a plurality of signal sections into which the third signal reproduced by the third recorder/reproducer means is divided. Thus, even though the capacity of the fourth recording medium is small, the signal can be processed.

There is also provided a digital recorder/reproducer having a fifth recording medium and a sixth recording medium on and from which an input signal including at least a video signal is recorded and reproduced, and capable of transmitting input and output signals between the recording media, characterized in that the digital recorder/reproducer reproduces the sixth recording medium while recording the input signal on the fifth recording medium.

There is also provided a digital recorder/reproducer having a fifth recording medium and a sixth recording medium on and from which an input signal including at least a video signal is recorded and reproduced, and capable of transmitting input and output signals between the recording media, characterized in that while the digital recorder/reproducer is recording the input signal on the sixth recording medium at a first recording position, the digital recorder/reproducer records a signal reproduced from a first position of the fifth recording medium on the sixth recording medium at a second recording position, and while the digital recorder/reproducer is reproducing the input signal recorded at the first recording position of the sixth recording medium and recording the reproduced signal on the fifth recording medium at a second recording position, the digital recorder/reproducer reproduces the recorded signal from the second recording position of the fifth recording medium. Thus, recording and reproduction can be apparently simultaneously performed by the recorder/reproducer.

In the digital recorder/reproducer, the speed of an input/output signal recorded/reproduced on and from said fifth recording medium is different from that recorded/reproduced on and from said sixth recording medium. Thus, the above operation can be performed when input and output signals are supplied at different speeds.

There is also provided a digital recorder/reproducer having fifth recorder/reproducer means and sixth recorder/reproducer means for recording and reproducing signals on a fifth recording medium and a sixth recording medium and capable of transmitting input and output signals between the recording media, the digital recorder/reproducer having receiver means for receiving a video signal, an audio signal and an information signal, compressed data generator means for compressing the video and audio signals to produce compressed data, expanded data generator means for expanding the compressed data to produce the original video and audio signals, recorder/reproducer means for recording and reproducing the compressed data on and from the fifth recording medium and the sixth recording medium, and data selector means for selectively switching signals reproduced from the fifth recording medium and the sixth recording medium, and the compressed data from the compressed data generator means, whereby while the compressed data is being recorded on the fifth recording medium, the sixth recording medium is reproduced. Thus, the compressed data can be processed.

In the digital recorder/reproducer, there are further provided CM predictor means for predicting the start and end points of commercials included in a television broadcast, CM history memory means for storing the CM predicted results, and first control means for changing the places for signals to be recorded and reproduced, of the fifth and sixth recording media in accordance with the CM history information. Thus, the signal with the commercials removed can be reproduced.

In the digital recorder/reproducer, there are further provided multi-receiver means for receiving a plurality of television broadcasts at a time, multi-compressed-data generator means for compressing each of the signals received by the multi-receiver means, and multi-recorder means for recording each of the compressed data obtained from the multi-compressed-data generator means on the fifth and sixth recording media. Thus, a plurality of television broadcasts can be recorded.

In the digital recorder/reproducer, the digital compressed data generator means has compression-ratio changing means for changing the compression ratio adaptively according to the video signal and/or the audio signal, and after a certain amount of data is recorded on said fifth recording medium, the compressed data are transmitted from the fifth recording medium to the sixth recording medium, and recorded thereon. Thus, data of small amounts can be effectively processed.

In the digital recorder/reproducer, transmission speed detector means is further provided for detecting that the compressed data is generated from the compressed data generator means at a transmission speed different from that of the compressed data recorded on the fifth recording medium, and after the compressed data of a certain amount is recorded on the sixth recording medium, the compressed data is transmitted from the second recording medium to the fifth recording medium, and recorded thereon on the basis of the detected results. Thus, data can be effectively recorded on the recording medium.

In the digital recorder/reproducer, means is further provided for reproducing the fifth recording medium and at the same time transmitting the compressed data reproduced from the fifth recording medium to the sixth recording medium, thus recorded thereon, and when the past video and audio signals are reproduced from the fifth recording medium, the signals are reproduced from the sixth recording medium. Thus, recording and reproduction can be made effectively.

In the digital recorder/reproducer, there are further provided time code generator means for generating time information (time code signal), time code recorder/reproducer means for recording and reproducing the time code signal on and from the fifth and sixth recording media, control means for controlling the reproduction positions of the fifth and sixth recording media from which data is reproduced, in accordance with the time code signal, and the data selector means is operated to switch in accordance with the reproduced time code signal. Thus, the time information can be managed.

In the digital recorder/reproducer, there are further provided means for recording the video signal, audio signal and information signal (television broadcast) from the receiver means on the fifth recording medium, means for recording a certain portion of the television broadcast program on the sixth recording medium, means for making the fifth recording medium be ready for reproduction while reproducing the sixth recording medium, and control means for controlling the reproduction positions of the fifth and sixth recording media from which data is reproduced, in accordance with the reproduced time code signal, and the data selector means is operated to switch the reproduced signals from the fifth and sixth recording media in accordance with the time code signal. Thus, effectively the reproduction positions can be controlled and the recording and reproduction can be made.

In the digital recorder/reproducer, simultaneous recorder/reproducer means is further provided for recording on the sixth recording medium and at the same time reproducing the sixth recording medium from an arbitrary position. Thus, recording and reproduction can be simultaneously made on and from the sixth recording medium.

In the digital recorder/reproducer, the fifth recording medium is a magnetic tape, magnetic disk, magnetooptical disk, phase change optical disk or semiconductor memory, and the sixth recording medium is a magnetic tape, magnetic disk, magnetooptical disk, phase change optical disk or semiconductor memory. Thus, the above operation can be made by use of a plurality of recording media of different kinds.

In the digital recorder/reproducer, the recording capacity of the fifth recording medium is different from that of the sixth recording medium. Thus, the above operation can be made on the recording media of different capacities.

In the digital recorder/reproducer, the compressed data generator means and expanded data generator means are based on MPEG system. Thus, data can be compressed and expanded according to the MPEG system.

In the digital recorder/reproducer, the compressed data generator means and expanded data generator means can arbitrarily change the compression ratio and expansion ratio. Thus, data processing can be made more effectively.

BEST MODE FOR CARRYING OUT THE INVENTION

The constructions of embodiments of a digital recorder/reproducer of the invention and the processing of the video and audio signals will be described in detail with reference to the drawings.

In the following descriptions about the operation of digital recorder/reproducer, the first and second recording media are assumed as magnetic tape and hard disk (hereinafter, HDD). In the embodiments of the invention, the first recording medium may be a magnetic disk, magnetooptical disk, phase change optical disk or semiconductor memory. Similarly, the second recording medium may be a magnetic disk, magnetooptical disk, phase change optical disk or semiconductor memory.

First Embodiment

Figure 1:
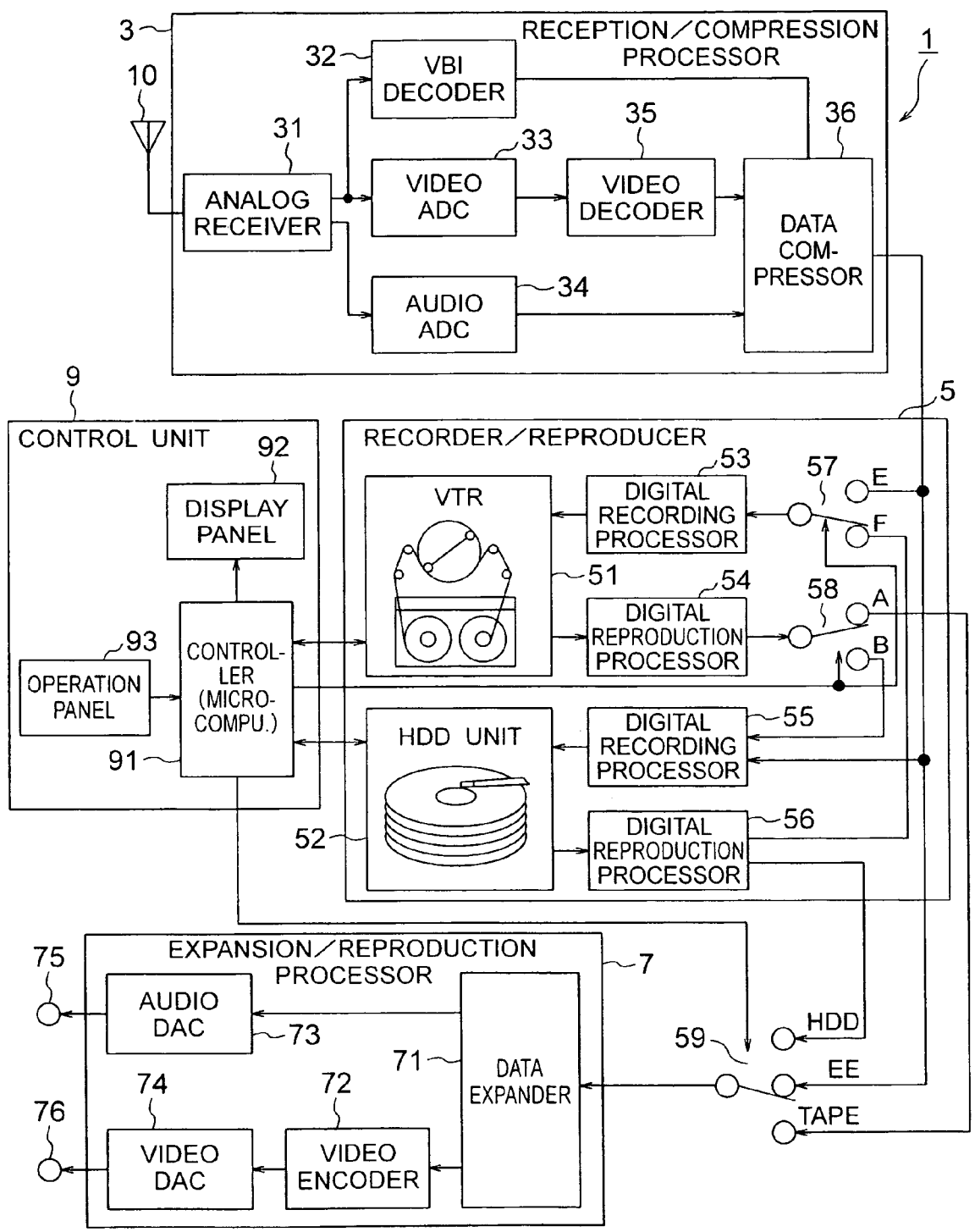
FIG. 1 is a block diagram of the construction of a digital recorder/reproducer according to the first embodiment of the invention.

The construction of a digital recorder/reproducer according to the first embodiment of the invention, and the signal processing will be described with reference to FIG. 1. FIG. 1 is a block diagram of the construction of a digital recorder/reproducer according to the first embodiment.

A digital recorder/reproducer 1 is formed of a reception/compression processor 3 that receives an analog television broadcast, converts the received signal into a digital signal, compresses the digital data and supplies the digital compressed data, a recording/reproducing processor 5 for recording and reproducing the digital compressed data, an expansion/reproduction processor 7 for expanding the digital compressed data and converting it back to the analog signal, and a control unit 9 for controlling the transfer of digital compressed data between those processors and the recording/reproducing processor 5.

The reception/compression processor 3 includes an analog receiver 31, a VBI decoder 32, a video analog-digital converter (hereinafter, video ADC) 33, an audio analog-digital converter (hereinafter, audio ADC) 34, a video decoder 35, and a data compressor 36.

The recording/reproducing processor 5 includes a digital VTR recorder/reproducer 51 as the first recorder/reproducer means, a hard disk recorder/reproducer 52 as the second recorder/reproducer means, a first digital recording processor 53 for executing the processing of a signal to be recorded in the first recorder/reproducer, a first digital reproducing processor 54 for executing the processing of the signal reproduced from the first recorder/reproducer, a second digital recording processor 55 for executing the processing of a signal to be recorded in the second recorder/reproducer, and a second digital reproducing processor 56 for executing the processing of the signal reproduced from the second recorder/reproducer. The recording/reproducing processor 5 further includes three switching circuits 57, 58, 59 for switching the paths of the digital signals.

The expansion/reproduction processor 7 includes a data expander 71, a video encoder 72, an audio digital-analog converter (hereinafter, audio DAC) 73, and a video digital-analog converter (hereinafter, video DAC) 74.

The control unit 9 includes a controller 91 formed of a microcomputer, a display panel 92, and an operation panel 93.

The analog receiver 31 of the reception/compression processor 3 selectively receives a desired channel of the analog television broadcasts received by an antenna 10, and produces an analog video signal and an analog audio signal.

The VBI decoder 32 decodes the information signal multiplexed in the vertical blanking periods of the video signal. This information signal includes, for example, text information, caption information and news information.

The video ADC 33 converts the analog video signal to a digital video signal.

The audio ADC 34 converts the analog audio signal to a digital audio signal.

The video decoder 35 converts the digital video signal to digital data based on ITU-R BT. 601 (International Telecommunication Union, Radio Communication Center).

The data compressor 36, for example, encodes the digital video signal at a high efficiency according to MPEG 2 (Moving Picture Experts Group 2) to generate video digital compressed data, and superimposes the audio digital signal and decoded information signal on the video digital compressed data.

This video digital compressed data is transmitted via the E contact of the switching circuit 57 to the digital recording processor 53, directly to the digital recording processor 55, and via the contact EE of the switching circuit 59 to the data expander 71.

A digital recorder/reproducer (hereinafter, digital VTR) was used as the first recorder/reproducer means 51 of the recording/reproducing processor 5, and a hard disk recorder/reproducer (hereinafter, HDD unit) as the second recorder/reproducer means 52.

The digital recording processors 53, 55 have substantially the same function. The digital recording processors 53, 55 each include a buffer, an encoding circuit for error correction code, a framing circuit, and a channel modulating circuit, thereby encoding the video digital compressed data to make error correction code, and framing and channel-modulating it.

To the digital recording processor 53 are supplied the video digital compressed data from the data compressor 36 via the E contact of the switching circuit 57, and the video digital compressed data from the digital reproducing processor 56 via the F contact thereof.

The output signal from the digital recording processor 53 is supplied to the digital VTR 51, and recorded on a magnetic tape. Here, in addition to the video digital compressed data, the above-mentioned information signal and a time code signal generated within the controller 91 are recorded on the magnetic tape.

Similarly, to the digital recording processor 55 are supplied the video digital compressed data directly from the data compressor 36, and the video digital compressed data from the digital reproducing processor 54 via the B contact of the switching circuit 58.

The output signal from the digital recording processor 55 is supplied to the HDD unit 52, and recorded on the hard disks. On the HDD are recorded the information signal and time code signal generated within the controller 91 in addition to the video digital compression data as in the digital VTR 51.

The digital reproducing processors 54, 56 have substantially the same function. The digital reproducing processor 54, 56 each have a channel demodulating circuit, a decode circuit for error correction code, and a frame decomposition circuit, thereby making channel demodulation, decoding for error correction code, and frame decomposition on the reproduced signal.

The output from the digital reproducing processor 54 is supplied via the A contact of the switching circuit 58 to the Tape contact of the switching circuit 59, and via the B contact to the digital recording processor 55.

The output from the digital reproducing processor 56 is supplied via the F contact of the switching circuit 57 to the digital recording processor 53, and to the HDD contact of the switching circuit 59.

The data expander 71 of the expansion/reproduction processor 7 expands the video digital compressed data sent from the data compressor 36, digital reproducing processor 54 or digital reproducing processor 56 into digital video data and digital audio data based on ITU-R BT. 601 (International Telecommunication Union, Radio Communication Center) according to an expansion process of, for example, MPEG 2, and supplies them to the video encoder 72 and audio DAC 73, respectively.

The video encoder 72 converts the expanded digital video data to the digital video signal and supplies it to the video DAC 74.

The video DAC 74 converts the digital video signal to the analog video signal, and supplies it to a video output terminal 76.

The audio DAC 73 converts the expanded digital audio data to the analog audio signal, and supplies it to an audio output terminal 75.

The controller 91 controls the switching circuits 57, 58, 59 to operate, and controls the drive systems of the digital VTR 51 and HDD unit 52. The controller 91 is connected to the operation panel 93 and display panel 92.

According to the digital recorder/reproducer of this embodiment, while a broadcast program is being recorded on the digital VTR 51, the previously recorded program can be reproduced and viewed from the digital VTR 51. This operation will be described with reference to FIGS. 2 and 3.

Figure 2:
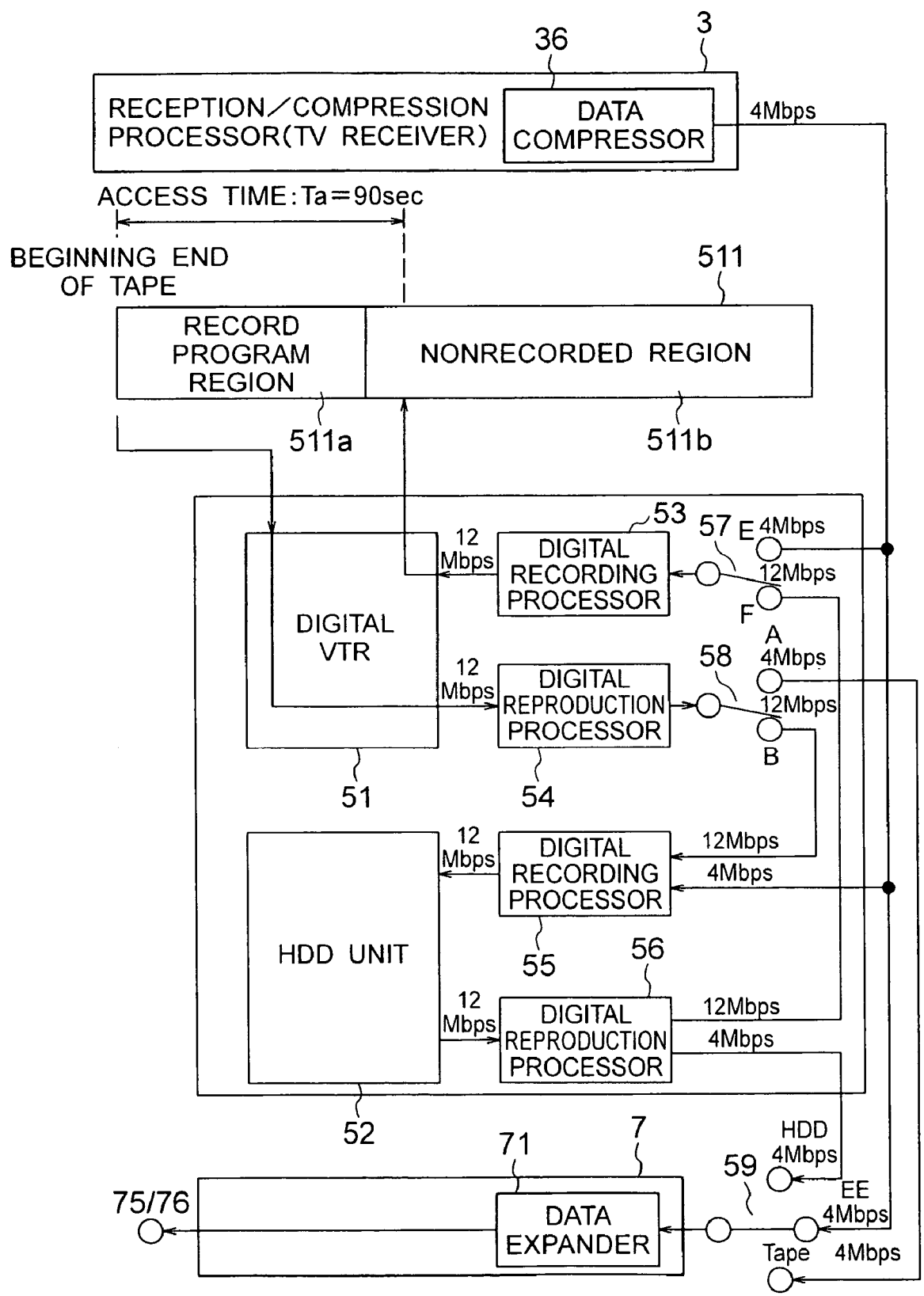
FIG. 2 is a diagram showing the state in which the HDD and magnetic tape are operated.

FIG. 2 shows the relation between a recorded program region 511a and a non-recorded region (a region being recorded) 511b of a roll of magnetic tape 511 set on the digital VTR 51.

Figure 3:
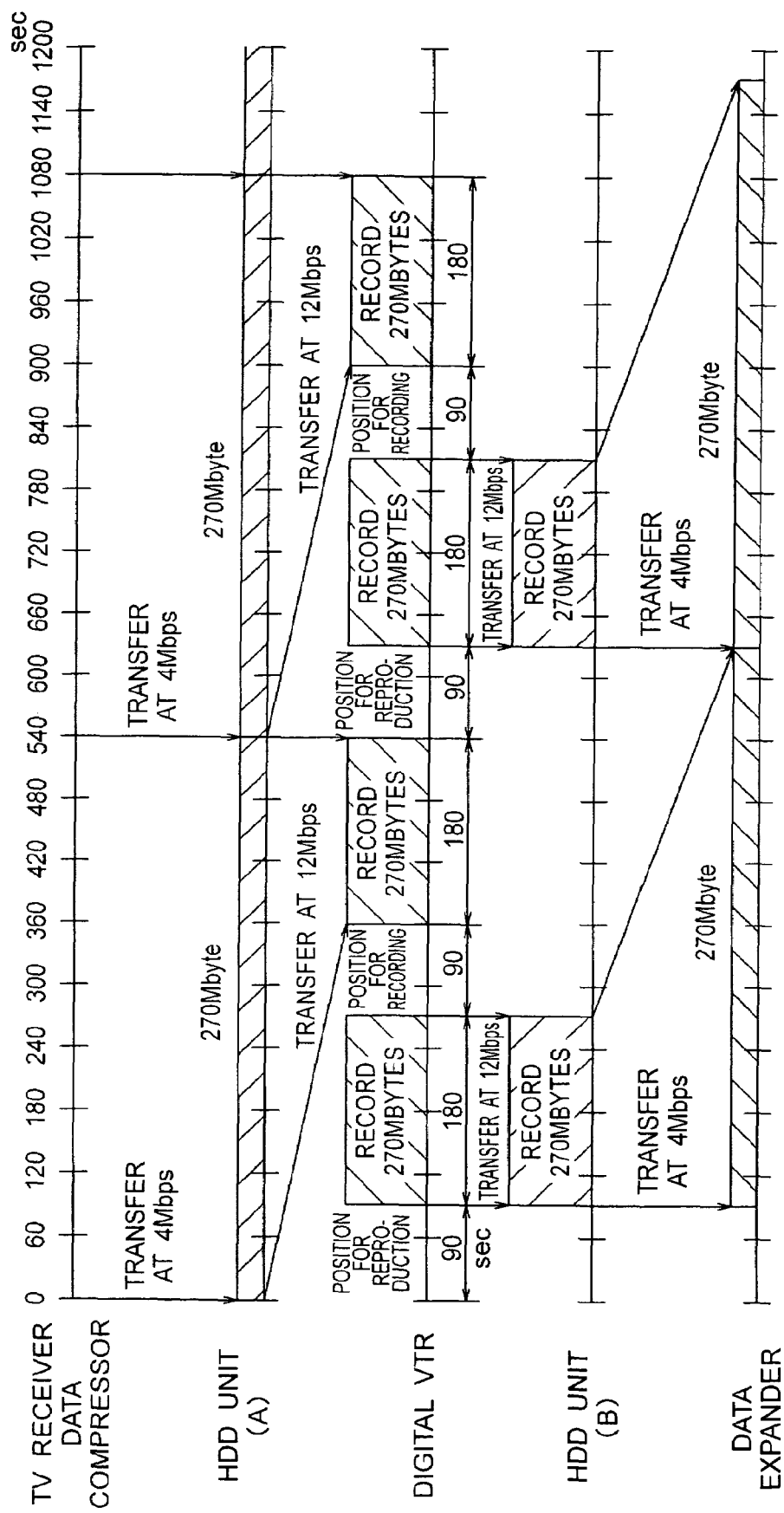
FIG. 3 is a digram to which reference is made in explaining the state in which data is transferred in the first embodiment of the invention.

FIG. 3 is a diagram showing the transfer of data in this embodiment.

Here, the access time Ta is the maximum time necessary to fast forward the tape from the current reproduction position to the beginning end of the non-recorded region (or to bring the tape to the recording position) or the maximum time necessary to rewind the tape from the current recording position to the reproduction resuming position (or to bring the tape to the reproduction position). This maximum time is assumed 90 seconds in this example.

In addition, it is assumed that the video/audio compression data rate is lower than the record/reproduction data rate of the magnetic tape. In other words, it is assumed that the video/audio compression data rate in the data compressor 36 of the reception/compression processor (TV receiver) 3, and the video/audio expansion data rate in the data expander 71 of the expansion/reproduction processor 7 are respectively 4 Mbps, and that the recording/reproduction data rate of the magnetic tape 511 and HDD unit 52 is 12 Mbps.

The operations in which a program is recorded in the non-recorded region 511b and at the same time the previously recorded program is reproduced from the recorded program region 511a of the magnetic tape 511 are the apparent parallel processing of the recording signal and recorded signal that can be achieved by using the large-capacity HDD unit 52 as a buffer. The HDD unit 52 makes recording and reproduction operations in a time-sharing manner. This means that a predetermine time is divided into a plurality of intervals of time which are assigned to the recording operation and the reproduction operation. The above parallel processing of recording and reproduction operations is emulated by using buffer memories incorporated in the digital recording processor 55 and digital reproduction processor 56. Even in the following embodiments, the HDD unit 52 makes the same operation. The HDD unit 52 is capable of faster access than the magnetic tape, and thus enough for the buffers.

While the HDD unit 52 is used in this embodiment, the HDD unit 52 may be replaced by other recording media suitable for random access, such as disk-like recording media of optical disk and magnetooptical disk or semiconductor memory.

Here, the maximum tape positioning time, namely, the time necessary to fast forward the tape from the current recorded-region reproducing position to the beginning end of the non-recorded region, or the time necessary to rewind the tape from the current recording position to the program reproduction position is assumed to be, for example, 90 seconds. Here, for the sake of better understanding, the recording/reproduction data rate of the magnetic tape is assumed as 12 Mbps, and the video/audio compression data rate as 4 Mbps.

First, to reproduce the magnetic tape, the tape is brought to the position from which the reproduction is to start. It is enough to take 90 seconds, maximum for the tape transport. During the time in which the magnetic tape is transported to the reproduction start position, the digital compressed data (here, recording data) generated on the basis of the video and audio signals from the television receiver 3 is recorded on the HDD unit 52. This recording can be made at a data rate of 4 Mbps, minimum.

Then, the switching circuit 58 is switched to the contact B, and a predetermined amount (270 Mbytes) of data (here, called reproduced data) resulting from reproducing the magnetic tape for a certain time (for example, three minutes) is transferred via this contact to the HDD unit 52 where it is recorded. This transfer, if made at a data rate of 12 Mbps, minimum, can be completed in three minutes.

At this time, the digital compressed data generated on the basis of the video and audio signals from the television receiver 3 is still recorded in the HDD unit 52 in parallel with the reproduction operation.

Moreover, the data recorded in the HDD unit 52 is read and transferred to the data expander so that the reproduced video and audio signals can be viewed and listened to. This transfer can be made at a data rate of 4 Mbps, minimum.

When the recording of a predetermined amount (270 Mbytes) of reproduced data from the magnetic tape 511 to the HDD unit 52 is finished, the magnetic tape 511 is brought to a certain position within the non-recorded region 511b.

Even during this operation, the operations of recording the recording data in the HDD unit 52 and reading the reproduced data from the HDD unit 52 are still performed in parallel.

Then, the switching circuit 59 is switched to the HDD contact, and the switching circuit 57 to the F contact, allowing the recording data to be transferred from the HDD unit 52 to the non-recorded region 511b of the magnetic tape 511, thus copying the amount of data (270 Mbytes).

Thus, if data is transferred at a high data rate to the magnetic tape, the time taken to transfer is short, and hence the remaining time can be used for other processing.

In parallel with this copy operation, the data stored in the HDD unit 52 is read and processed so that it can be viewed and listened to, and the recording data from the television receiver 3 is recorded in the HDD unit 52.

In these processings, the HDD unit 52 apparently simultaneously makes recording and reproducing operations, and in this case the recording and reproduction of the digital compressed data are alternately repeated with a short period of time. In addition, a plurality of heads may be provided on the HDD unit 52.

Thus, use of a single digital recorder/reproducer according this embodiment of the invention can achieve the performance of both recording the television signal and reproducing the recorded program apparently at the same time by repeating a sequence of these operations.

If this sequence of operations is repeated with a short period of time, the capacity of the HDD unit to be used can be reduced.

Figure 4:
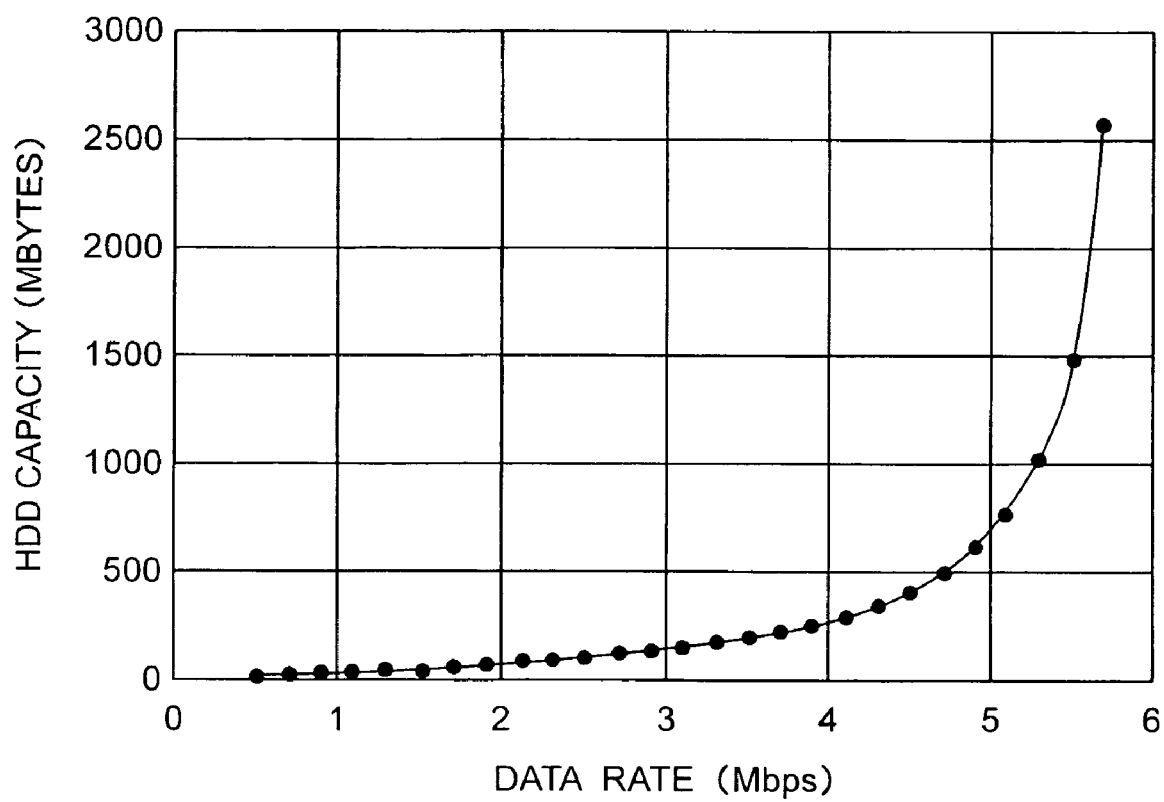
FIG. 4 is a diagram showing the results of calculating the HDD buffer capacity.

With reference to FIG. 4, a description will be made of the use of the HDD unit as a buffer on the basis of the results of computing the video/audio compressed data rate and capacity of HDD unit 52.

FIG. 4 shows the relation between the video/audio compressed data rate (Mbps) on the abscissa and the capacity (Mbytes) of HDD unit 52 on the ordinate that is necessary as a buffer. Under the above conditions, the capacity of HDD unit 52 required as a buffer will be found about 270 Mbytes and to be small enough to produce at low cost from the graph.

Moreover, the beginning end of a recorded program on the magnetic tape 511 can be apparently instantly brought to be ready to start reproducing by a digital recorder/reproducer of the same function blocks having a serial-access large-capacity recorder/reproducer (VTR) and a fast random-access recorder/reproducer (HDD).

In this operation, a television program of the same contents is recorded on the magnetic tape 511 and HDD unit 52. At this time, on the HDD unit 52, is recorded only the data that continues a predetermine period from the beginning end of the program.

In the reproduction operation, the digital compressed data of the above program is instantly reproduced from the HDD unit 52. During this operation, the magnetic tape 511 is fast transported to reach the beginning end of this program. In this case, the beginning end of this program is positioned a certain time after the currently reproducing position of the HDD unit 52.

After the end of this positioning, the magnetic tape 511 is started to reproduce, while being adjusted in its transport speed so that the time bases of the digital compressed data currently reproduced from the HDD unit 52 and magnetic tape 511 can be synchronized with each other (hereinafter, called the phase adjusting operation). When the phase adjusting operation is completed, the switching circuit 59 is switched from the contact HDD to contact Tape, so that switching is made from the reproduction of HDD unit 52 to the reproduction of magnetic tape 511. Thereafter, the digital compressed data reproduced from the magnetic tape 511 can be processed and viewed.

The above phase adjusting operation can be made by shifting the reproduced position of the magnetic tape 511 on the basis of the time codes recorded on the HDD unit 52 and magnetic tape 511 so that both time codes can coincide.

Moreover, by using a digital recorder/reproducer of the same function blocks as the digital recorder/reproducer of this embodiment, it is possible that, while the program is being recorded, this currently recorded program can be reproduced from the first.

This function is requisite for the user. For example, even when the user previously sets a timer of this recorder for a program of 9:00 p.m. to 9:54 p.m. so that the program can be started to record during that period of time, and then comes home at 9:20 p.m., the user can view this program from the first (9:00 p.m.) without resetting the timer. This operation will be described with reference to FIGS. 1 and 2.

The user can register the channels, start times and end times of desired programs by use of the operation panel 93 and display panel 92.

When a time to record comes, the digital VTR 51 starts recording the digital compressed data of the video and audio signals of the corresponding program on the magnetic tape 511.

At the same time, the HDD unit 52 records the same digital compressed data as above.

At this time, the switching circuit 57 is switched to the contact E position, the switching circuit 57 to the contact A position, and the switching circuit 59 to the contact HDD position.

When the program is viewed from the first while being recorded, the digital compressed data is reproduced from the HDD unit 52 and decoded so that the original video and audio signals can be reproduced. Even during the reproduction of the digital compressed data from the HDD unit 52, the digital VTR 51 still continues to record this program.

When the time code of the compressed data reproduced from the HDD unit 52 is equal to or larger than that of the digital compressed data that is being currently recorded in the digital VTR 51, the switching circuit 59 is operated to change to the contact EE position, thus bringing about the state in which the user can view in real time the currently on-air program.

Therefore, the user can view freely, the programs recorded before this program, in different playback modes such as past playback, speed-changed playback and retry playback.

Thus, according to the first embodiment of the invention, while a television signal is being recorded on the recording medium of the digital recorder/reproducer, the recorded program can be reproduced from the same recording medium at the same time.

Moreover, the beginning end of the recorded program on the magnetic tape 511 can be apparently instantly drawn out. In addition, while a program is being recorded, the already recorded portion of the program that is being currently recorded can be reproduced from an arbitrary position.

While the compression and expansion means in the first embodiment is of MPEG 2, other type of compression means may be used.

Second Embodiment

A digital recorder/reproducer of the second embodiment of the invention will be described below.

In the second embodiment of the invention, a television broadcast program and commercials (hereinafter, CM) interposed in the program are discriminated at the time of recording or reproduction, and only the CM is removed from the program (that is, it is apparently instantly cut off, reproduced for quick seeing or fast forwarded) so that the user can view substantially only the program itself.

First, the method of discriminating the program and CM will be described. There are now various different methods of discriminating program and CM. Here, a method of discriminating by audio mode and another method of discriminating from video and audio signals will be given as examples. The program/CM discrimination means is not limited to the above, but may be other types.

In the audio-mode discrimination system, the program and CM are discriminated by whether the audio signal of the received television signal is bilingual, monaural or stereo. In most cases, the television broadcasts have monaural or bilingual audio signal, and CM has stereo audio signal. Therefore, the stereo mode of the audio signals corresponds to most of CM. However, in recent television broadcasts, the number of the stereo-sound programs is increased, and as a result the accuracy of discriminating CM from program by the above method is decreased.

Thus, the audio mode discrimination method is not used, and another means can be instead used for discriminating CM by using audio signal, video signal and time management means.

There are surely silent pauses of 100 m sec or more before and after CM, and the video signal is sure to suddenly change its level because of scene change when CM starts and ends.

Therefore, it can be considered that the start and end points of CM periods are detected from both the silent pauses and the sudden level change of video signal.

However, there is the possibility that the same silent pause and sudden video level change occur in the program, and thus use of only this discrimination method will cause error.

Thus, it can be considered that time condition is added to the method of discriminating by detecting the changes at the start and end points of CM, thereby more accurately discriminating the program and CM. In other words, the CM inserted in the program is often composed of a plurality of CMs the duration of which is controlled to be a predetermined time (for example, a multiple of 15 seconds).

Therefore, if the changes at the start points or end points of CM are detected at certain intervals of time (for example, 15 seconds or integral multiples of that value) or continuously for a certain time or above, those intervals can be decided to be CM.

The CM decided by the above method is removed (cut off, reproduced for quick seeing, or fast forwarded) from the program by the following reproducing method.

Figure 11:
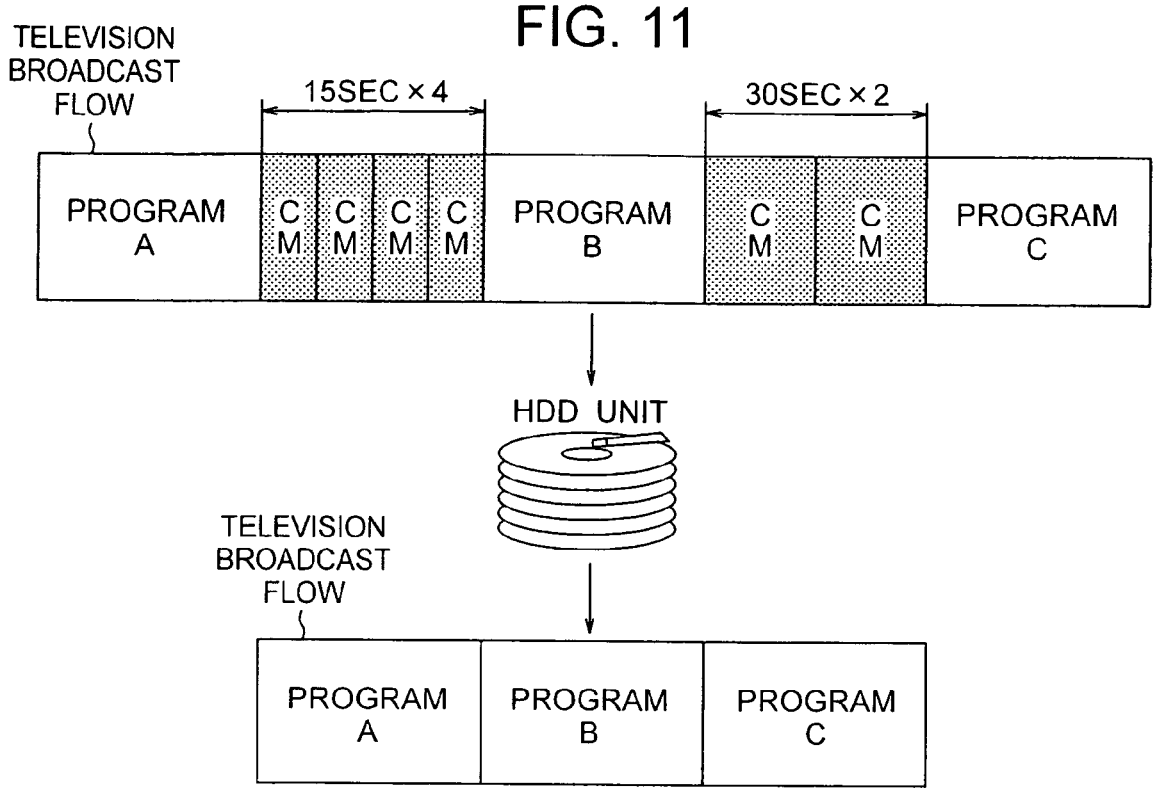
FIGS. 11 and 12 are imaging diagrams for explaining the removal of CM.
Figure 12:
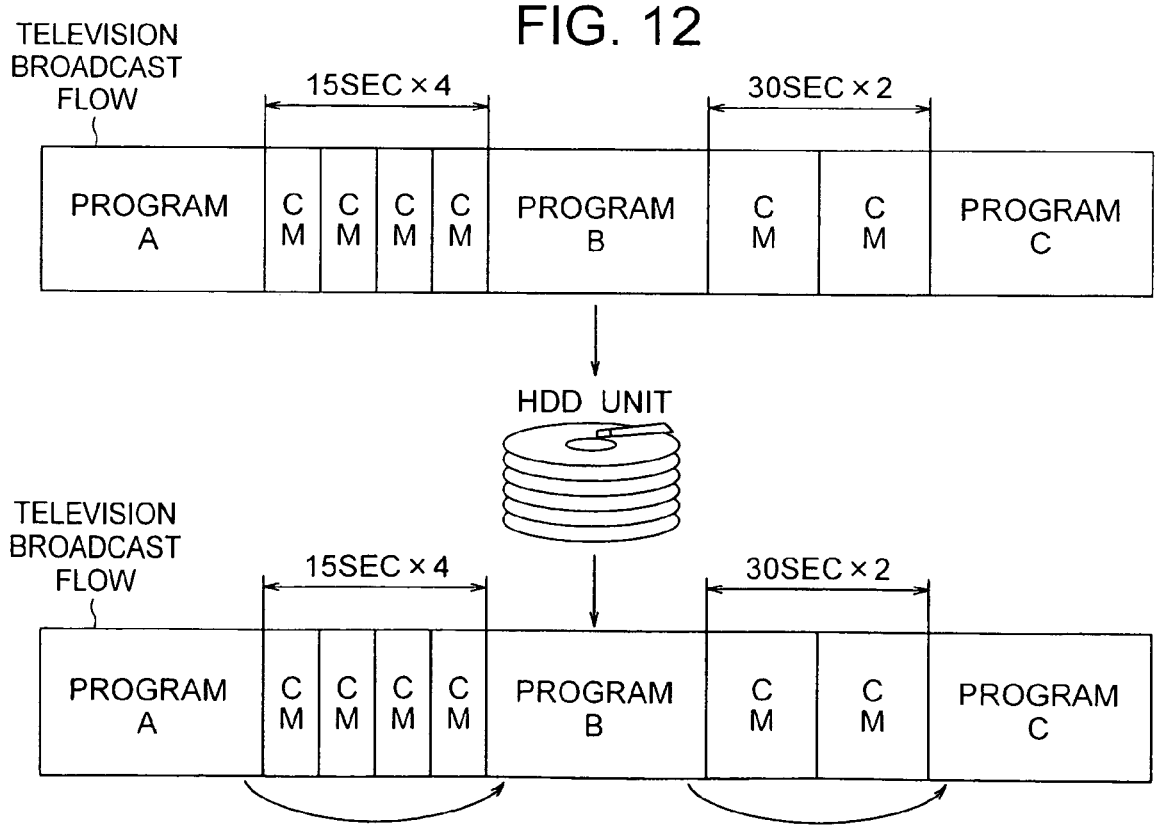

FIGS. 11 and 12 are imaging diagrams for the CM-removed reproduction. As illustrated in FIG. 11, the tape has recorded thereon programs A, B and C, four CMs between programs A and B, and two CMs between programs B and C. The HDD unit skips over the CMs and reads the programs, which are then recorded on the magnetic tape. When the magnetic tape is reproduced, it has no CMs recorded, and thus only the programs A, B and C are continuously reproduced (FIG. 11). Alternatively, the programs and the CMs are all recorded on the magnetic tape, and at the time of reproduction the HDD unit buffers those data, and instantly removes (cut off, reproduces for quick seeing, fast forwards) the CMs on the basis of the CM information decided by the above method (see FIG. 12), thereby the programs A, B and C being reproduced as if they were continuous. Or only the CMs may be fast reproduced.

Figure 5:
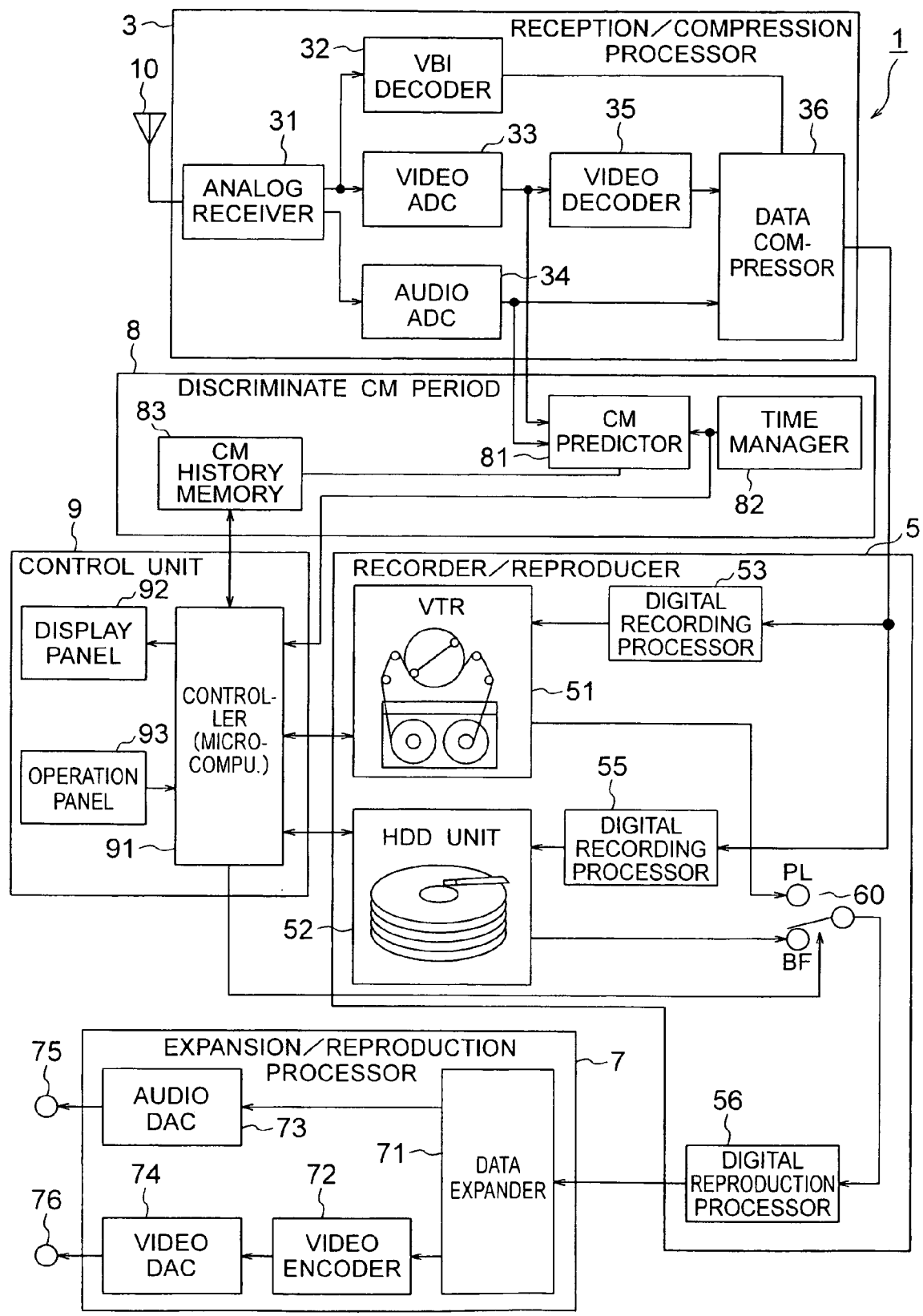
FIG. 5 is a block diagram of the construction of a digital recorder/reproducer according to the second embodiment of the invention.
Figure 6:
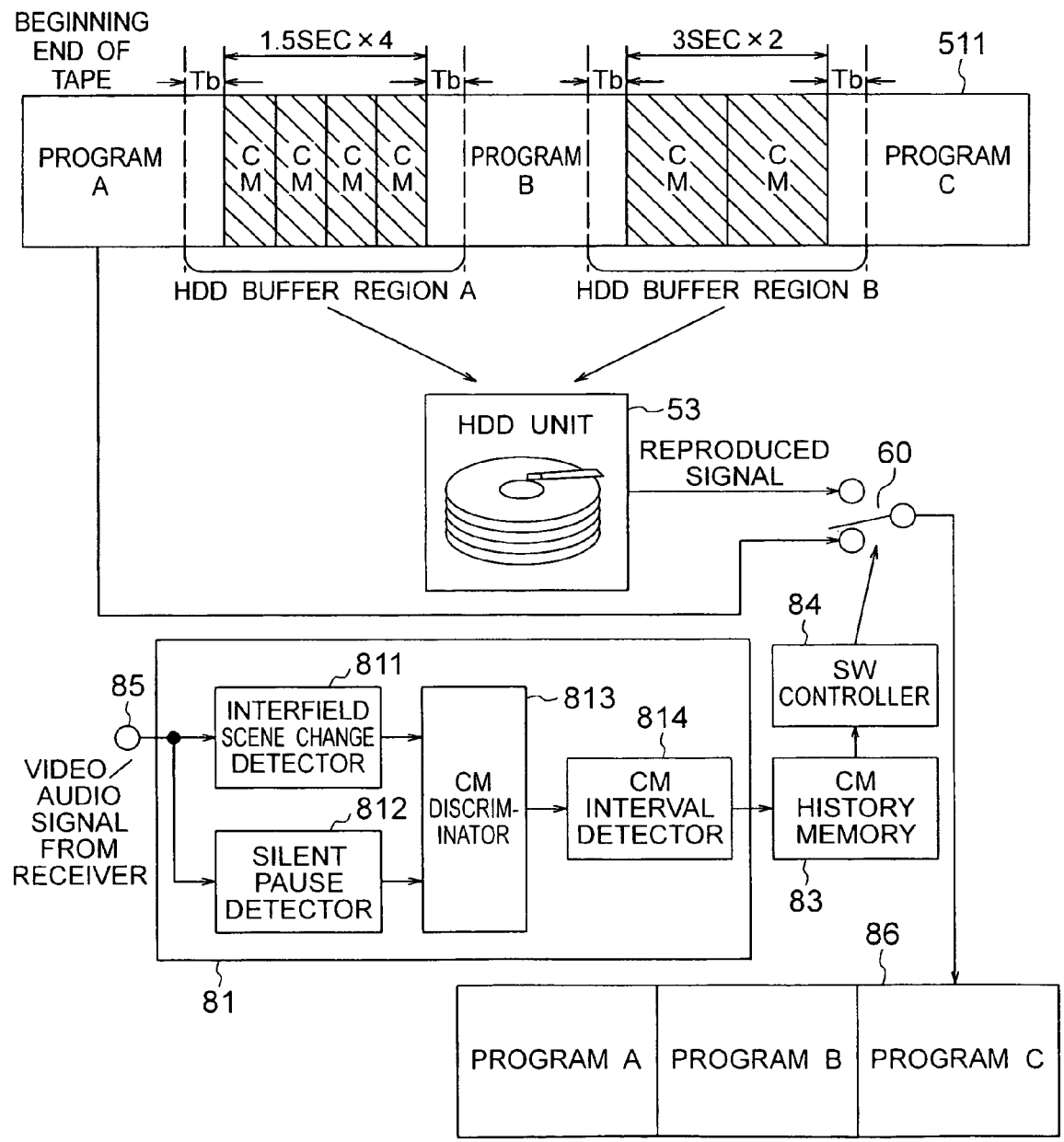
FIG. 6 is a digram showing the CM cutting operation.

Examples of the digital recorder/reproducer using the above CM discrimination method will be described. First, a first example will be mentioned with reference to FIGS. 5 and 6. FIG. 5 is a block diagram of the construction of a digital recorder/reproducer according to the second embodiment. In FIG. 5, like elements corresponding to those in the first embodiment are identified by the same reference numerals, and will not described in detail. FIG. 6 is a diagram to which reference is made in explaining the construction and operation of the CM cutting function.

The digital recorder/reproducer 1 of this example is different from the recorder/reproducer of the first embodiment in that a CM period discriminating function is added to decide whether the content of the received broadcast is currently a program or CM, that single digital reproduction processor means 56 is used common to the two digital reproduction processor means 54, 56 of the recording/reproduction processor 5, and that another switching circuit 60 is provided for selecting the signal to the digital reproduction processor 56.

CM period discriminating means 8 for achieving the above CM period discriminating function has CM predicting means 81, time management means 82, and a CM history memory 83.

As illustrated in FIG. 6, the CM predicting means 81 includes interfield scene change detecting means 811, a silent pause detector 812, a CM discriminator 813 and a CM interval detector 814.

The interfield scene change detecting means 811 monitors the video signal, detects the video signal level difference between the fields (for example, luminance signal level difference). When the means 811 detects a video signal level change that is equal to or larger than a predetermined value, it decides that it is a scene change, and produces a scene change decision signal.

The silent pause detector 812, when detects a silent pause interval of a certain period or more, generates a silent pause period detection signal.

The CM discriminator 813, when detecting both the scene change decision signal and the silent pause period detection signal, generates a signal indicating the start point or end point of CM.

The CM interval detector 814 monitors the broadcast time interval (for example, an interval of 15 seconds) of the signal indicating the start point or end point of CM produced from the CM discriminator, and decides that the output signal is the signal of having detected the start point or end point of CM when the time interval of the signal satisfies the broadcast time interval and a sequence of a plurality of those intervals.

The CM predicting mean 81 receives the video signal and audio signal fed from the TV receiver 3 and the time information supplied from the time manager 82, and predicts the start point and end point of CM according the received signals.

The predicted CM start point and end point information is recorded in the CM history memory 83 to be associated with the time signal recorded on the magnetic tape.

The program recording operation for apparently cutting off the CM will be described with reference to FIG. 6.

Referring to FIG. 6, the video signal and audio signal fed from the television receiver 3 are supplied through an input terminal to the CM predicting means. For the sake of easy explanation, a single input terminal is shown in FIG. 6.

A switching controller 84 operates on the basis of the time-basis relation between the program and CM stored in the CM history memory 83, or on the recording data recorded on the magnetic tape 511 shown in FIG. 6 and the time table indicating the position on the table. The time table describes the time-basis relation between the program and CM recorded on the magnetic tape 511.

The magnetic tape 511 has all received contents (recording data), or program A, CM, program B, CM and program C recorded in turn from the beginning end of the tape.

The HDD unit 52 records the recording data according to the time table as does the magnetic tape 511.

The HDD unit 52, when the CM predicting means 81 detects the start point and end point of CM, completes the recording of the CM intervals described on the time table and predetermined periods (Tb) before and after the CM periods (hereinafter, HDD buffer recording) with the other portions not recorded, and then continues to record the recording data.

The Tb period has a time set to correspond to the period in which the CM recorded regions on the magnetic tape are fast forwarded. This set time is changed adaptively to the CM recorded regions on the magnetic tape.

The HDD buffer recording A period and HDD buffer recording B period of the time table are completely recorded in the HDD unit 52.

The HDD unit 52 employs the HDD recording region with the above period not completely recorded (imperfect recording region) as a cache region, and repeats the recording in that region.

The method of reproducing the magnetic tape with the CM apparently cut off will be described with reference to FIG. 6. The time table in FIG. 6 is this time replaced by the magnetic tape.

First, the magnetic tape 511 is brought to the beginning end, and the program A is reproduced from the tape. When the HDD buffer recording A begins to be reproduced from the magnetic tape, the switching circuit 60 is operated to change from contact PL position to the contact BF position, and the reproduced HDD buffer recording A is supplied from the HDD unit 52 instead of the magnetic tape 511.

The HDD unit 52 reproduces the Tb regions before and after the HDD buffer recording A with the CM recorded region jumped over. The HDD unit 52 can make the above operation because of its fast random accessing ability.

During the period in which the HDD unit 52 is reproducing the HDD buffer recording A (reproducing 2 Tb periods), the digital VTR 51 fast forwards the magnetic tape 511 to bring it to the beginning end of the program B (Ta ahead of the beginning end of the program B), and waits for the HDD unit 53 to end the reproduction of the HDD buffer recording A.

When the HDD buffer recording A is completely reproduced, the reproduced signal of program B from the magnetic tape is switched to.

Thus, since only the CM periods can be removed, the user can view the programs A, B and C with the CM apparently cut off.

The reproduced-signals switching operation can be executed by the switching circuit 60 and the switching controller 84.

While in the above method the data predicted as CM, for example, the HDD buffer recording A and HDD buffer recording B are recorded in the HDD, and the reproduced signals from the magnetic tape and the HDD are switched and supplied, a construction using another method may be used. For example, it is assumed that data is read from the HDD 52 in real time, and that the rate at which the data is read from the VTR 51 is selected to be faster than the real-time reading speed. The data read from the VTR 51 is once recorded in the HDD 52. The data previously read from the VTR 51 are at least sequentially accumulated for a predetermined time in the HDD 52.

The data accumulated in the HDD 52 are controlled to be sequentially reproduced in real time, and the predicted CMs can be cut off by changing the reading positions in the HDD 52. In addition, if the predicted CMs reading speed is set to be high, the CMs can be fast reproduced.

In the above example, the CMs are cut off by the HDD unit 52 that refers to the CM history memory 83 in which the CM information decided at the time of recording is already recorded. Since the CMs can be apparently cut off or fast reproduced, the user can view the programs continuously, and thus the usability is excellent.

A second example of the digital recorder/reproducer using the above CM discrimination method will be described. In the first example the CMs are cut off, reproduced for quick seeing or fast forwarded on the basis of the program and CM history information recorded in the CM history memory when the program is recorded, while in the second example the program and CMs of the television broadcast are discriminated at the time of reproduction, and the CMs are cut off, reproduced for quick seeing, or fast forwarded at the time of reproduction. The operation of the second example will be described with reference to FIGS. 17, 18 and 19. In this example, it is not necessary to always store the CM history information in the recording medium such as the CM history memory and HDD unit.

Figure 18:
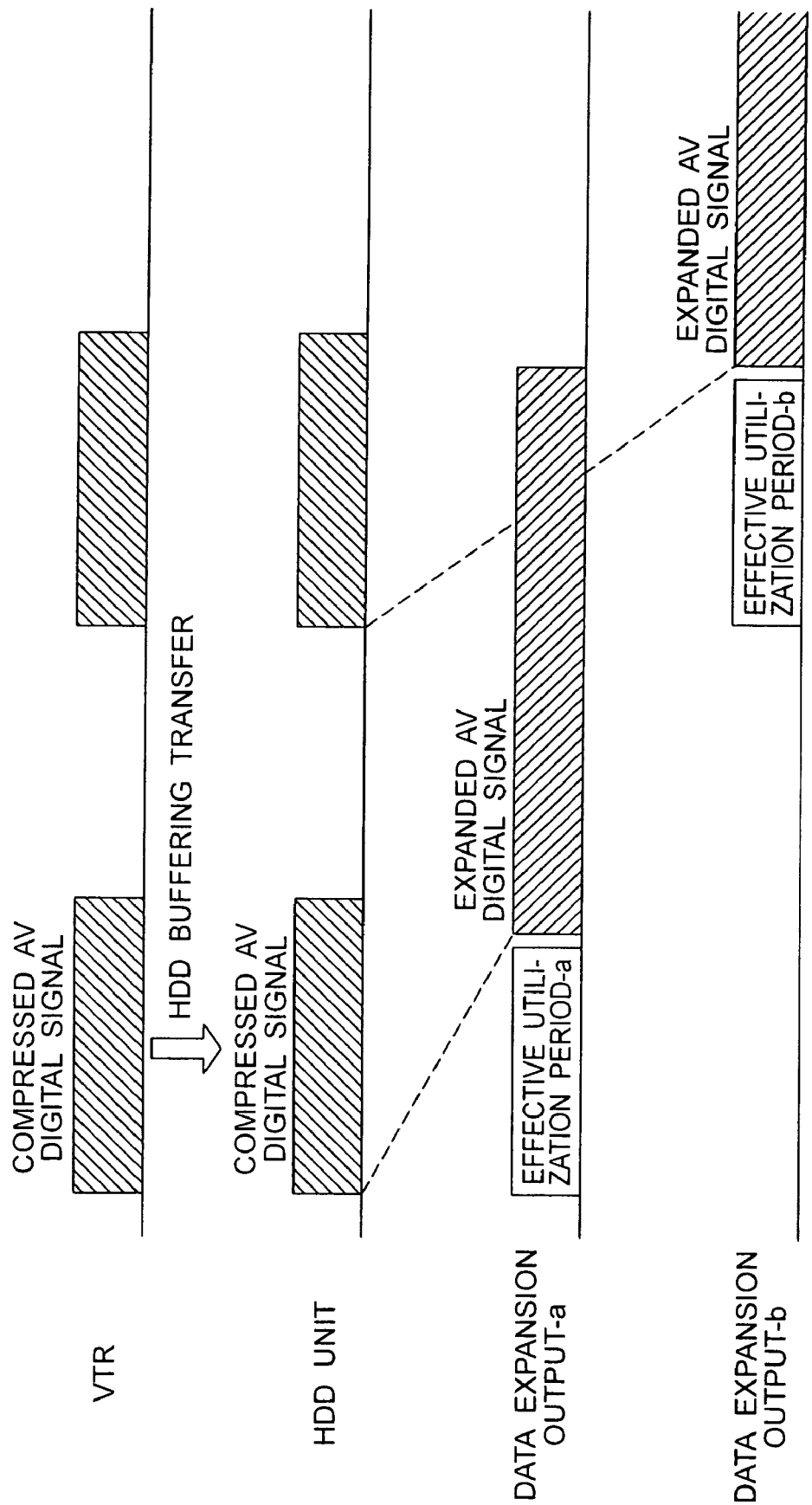
FIG. 18 is a diagram to which reference is made in explaining the state in which a digital signal is transferred at the time of reproduction.

FIG. 18 is an imaging diagram of the second example. The compressed AV digital signal containing CMs is transferred from the VTR to the HDD unit, thereby buffered. During this interval (effective usable period-a), the compressed AV digital signal is expanded through another path not shown, and the CM discrimination is performed by use of the expanded signal. By referring to the CM history information obtained here when the data expansion output-a is produced from the HDD unit, or when the expanded AV digital signal is fed to the outside, it is possible that the CMs can be cut off, reproduced for quick seeing, or fast forwarded. Repetition of the above operation (data expanded output-b) will enable long time reproduction.

Figure 17:
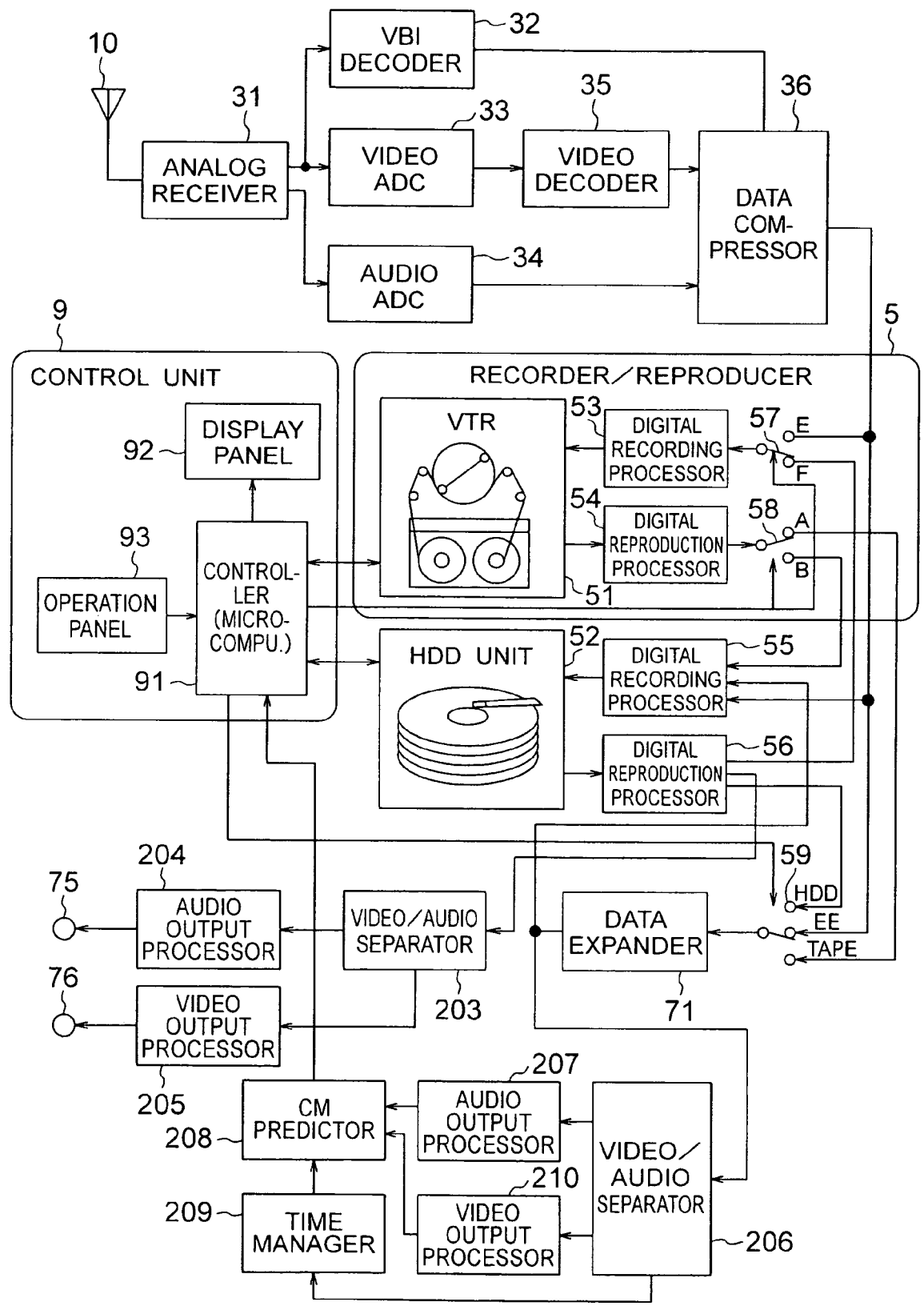
FIG. 17 is a block diagram of the construction of a digital recorder/reproducer according to the second embodiment of the invention.

The operation of this structure which is shown in FIG. 17 will be described below. In FIG. 17, like function blocks corresponding to those in FIG. 1 are identified by the same reference numerals and will not be described.

While the program recorded on the magnetic tape is being reproduced, the HDD unit 52 buffers the data from the tape, and makes parallel operation of recording and reproduction. The digital AV signal reproduced from the HDD unit 52 by buffering is supplied through the digital reproduction processor 56 to the switching circuit 59. The switching circuit 59 is operated to change to the contact HDD position, allowing the digital AV signal to be fed to the data expander 71. The data expander 71 expands the digital AV signal, and supplies it to a video/audio separator 206. The video/audio separator 26 separates the digital AV signal into a digital video signal and a digital audio signal, which are then supplied to video and audio output processors 210 and 207, respectively. The video and audio output processors 210 and 207 restore the input signals into the original video and audio signals, which are then supplied to a CM predictor 208. The CM predictor 208 and a time manager 209 operate in the same way as in the first example to predict the CM start and end points.

The digital AV signal produced from the data expander 71 is also supplied again to the digital recording processor 55, and stored in the HDD unit 52.

The expanded digital AV signal is always recorded for a predetermined time, for example, at least 60 seconds or more in real time in order for the CMs to be discriminated from the program.

The digital AV signal fed to the video/audio separator 206 is always read faster than the digital AV signal fed to a video/audio separator 203 shown in FIG. 17. This operation is made for previously predicting the CMs at the time of reproduction. The digital AV signal is read, for example, at least 60 seconds or more in real time faster. In this reading-faster operation, the CM predictor 208 detects the CM start and end points, and the detected signal is supplied to the controller, or microcomputer 91. The controller 91 controls the HDD unit 52 to jump over the CMs or reproduce the CMs fast when reproducing the expanded digital AV signal on the basis of the received detected signal. The expanded digital AV signal produced from the digital reproduction processor 56 is supplied to the video/audio separator 203. The video/audio separator 203 separates it into a digital video signal and a digital audio signal, and supplies them to the video and audio output processors 210 and 207, respectively. The video and audio output processors 210 and 207 restore those input signals into the original video and audio signals, and supply them to video and audio output terminals 76, 75, respectively.

Figure 19:
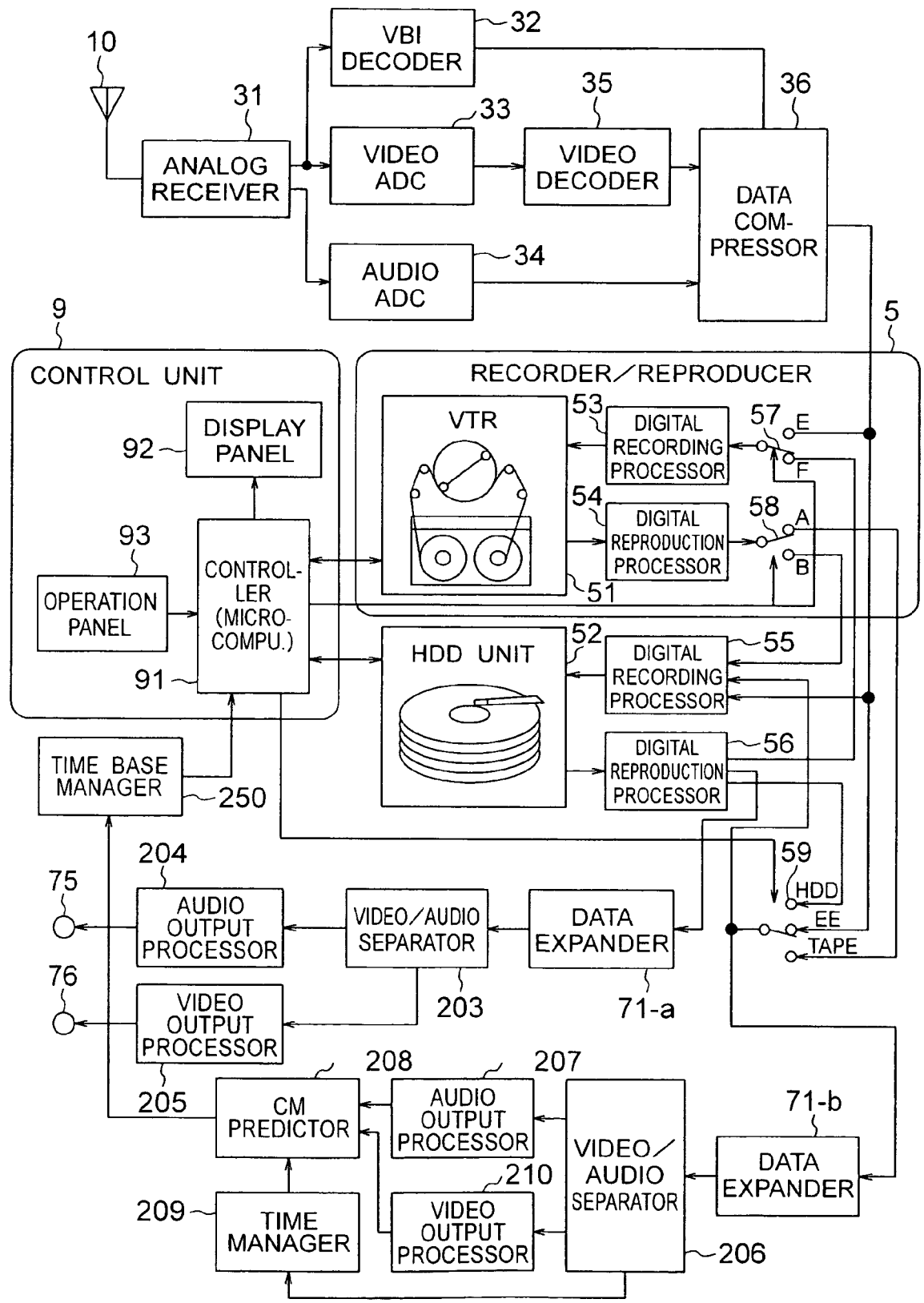
FIG. 19 is a block diagram of the construction of a digital recorder/reproducer according to the second embodiment of the invention.

FIG. 19 is a block diagram of the construction of an example for reproducing the compressed digital AV signal with the CMs removed. The reproduced compressed digital AV signal is expanded by a data expander 71-b. The CM prediction is made on the basis of this expanded data in the same way as above. The compressed digital data has a time stamp signal added to recognize time at every frame. In this example, a time base manager 250 expands the compressed digital data in accordance with the time stamp signal of the compressed digital data recorded in the HDD unit 52. The CMs are predicted by the CM predictor 208. Thus, the compressed digital data and the time base after expansion can be treated in the same dimension, and thus the CM information adapted to the time stamp signal can be supplied to the controller 91. Therefore, the HDD unit 52 having the compressed digital data recorded can be controlled to reproduce with the CMs of the buffered compressed data cut off by fast recognizing only the time stamp information. This means that the CM positions can be specified by reading the time code of the compressed data. The compressed digital data reproduced by the above operation has no CMs as a result of cutting off. It is then expanded by the data expander 71-b, and supplied through the external video/audio separator 203 to the output terminals. In this case, since the data buffered by the HDD unit 52 is the compressed digital AV data, there is the advantage that the load on the HDD unit 52 is reduced.

In the second example, since the CMs are discriminated from the program at the time of reproduction, the CMs can be cut off, reproduced for quick seeing and fast forwarded from the recording media in which any CMs are not discriminated from the program or from recording media in which programs were recorded by other recorder/reproducer.

A third example using the above CM discrimination method will be described with reference to FIG. 14. The third example does not need the memory for always storing only the CM history information, such as the CM history memory as the second example does not, but it is different from the second example in that the CMs are discriminated from the program at the time of recording the program.

The operation of this example will be described with reference to FIG. 14. In FIG. 14, like function blocks corresponding to those in FIG. 1 are identified by the same reference numerals, and will not be described.

Figure 14:
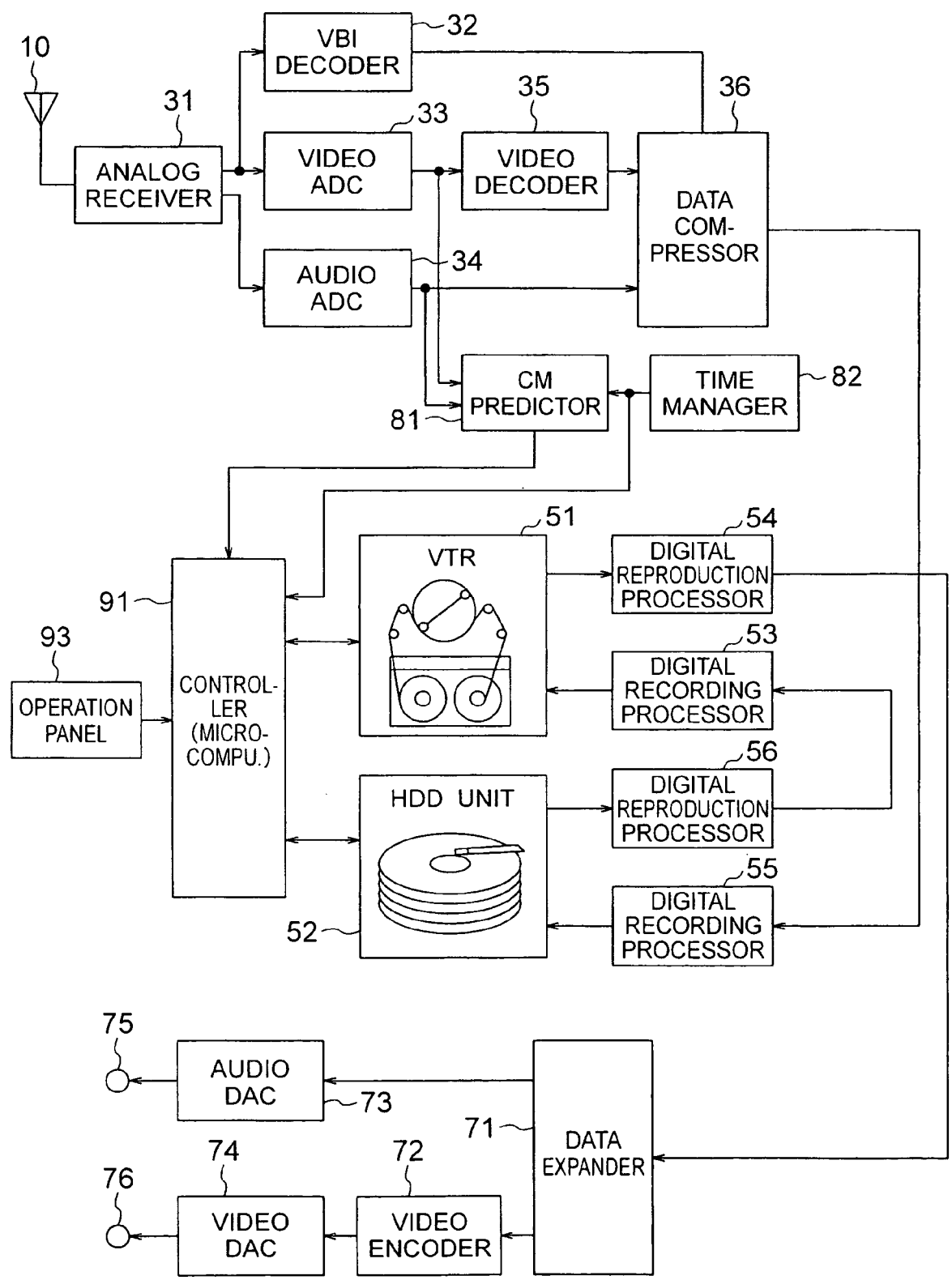
FIG. 14 is a block diagram of the construction of a digital recorder/reproducer according to the second embodiment of the invention.

At the time of recording, the recorder/reproducer shown in FIG. 14 makes the parallel operations of supplying the digital AV signal from the data compressor 36 through the digital recording processor 55 to the HDD unit 52 where it is buffered for a certain time, and reproducing the buffered digital AV signal from the HDD unit 52 through the digital reproduction processor 56. The digital AV signal produced from the digital reproduction processor 56 is fed through the digital recording processor 53 to the VTR 51 where it is recorded on the magnetic tape. The digital AV signal recorded on the magnetic tape is delayed by the buffering time relative to the digital AV signal just produced from the data compressor 36. The amount of buffering can be freely selected by the controller 91 so that the digital AV can be delayed by an arbitrary amount.

The CM predictor 81 detects, like the previous embodiment, the switching of video scenes, the silent pause, and the time of CM broadcast period, and supplies the predicted information of CM start and end points to the controller 91. The controller 91 controls the VTR 51 to record the index signal indicating the CM start and end points on the magnetic tape according to the CM predicted information. The index signal may be recorded on the tape in the longitudinal direction or on predetermined regions of the tape. In addition, the controller 91 may control the AV signal with CM cut off to be recorded on the magnetic tape according to the prediction information of CM start and end points. Also, though not shown, the position information (time stamp signal) of the compressed digital signal may be processed by providing a time base manager as is similar to the processing in the second example.

Moreover, while the magnetic tape is used in this example, a disk-like recording medium, such as magnetooptical disk or phase change optical disk, may be used to record the prediction information of CM start and end points, instead of the magnetic tape.

In this example, the CMs are discriminated from the program at the time of recording, and the results with the CMs removed are recorded on the recording medium. The start and end points of the CM are marked on the recording medium. Thus, the recorder/reproducer has no need to provide a memory in which the CM history information is always stored. Moreover, the CM information discriminated from the program in this recorder/reproducer can be used for other recorder/reproducer. In the first and second examples mentioned above, too, the CM history information can be recorded on the recording medium after the program recording or at the time of reproduction.

While the CMs are cut off, reproduced for quick seeing or fast forwarded in this embodiment, other portions than the CMs can be cut off, reproduced for quick seeing, and fast forwarded in this embodiment.

Thus, according to the second embodiment, at the time of recording or reproduction, the program itself of a television broadcast and the CMs interposed in the program can be discriminated, and the CMs can be removed (cut off, reproduced for quick seeing, or fast forwarded).

Third Embodiment

While the CMs are cut off, reproduced for quick seeing or fast forwarded at the time of receiving an analog broadcast signal in the recording/reproducing method of the second embodiment, the CMs can be cut off, reproduced for quick seeing or fast forwarded at the time of receiving a digital broadcast signal sent as digital compressed data according to the following embodiment. In the third embodiment, like elements corresponding to those in the second embodiment are identified by the same reference numerals, and will not be described in detail.

Figure 15:
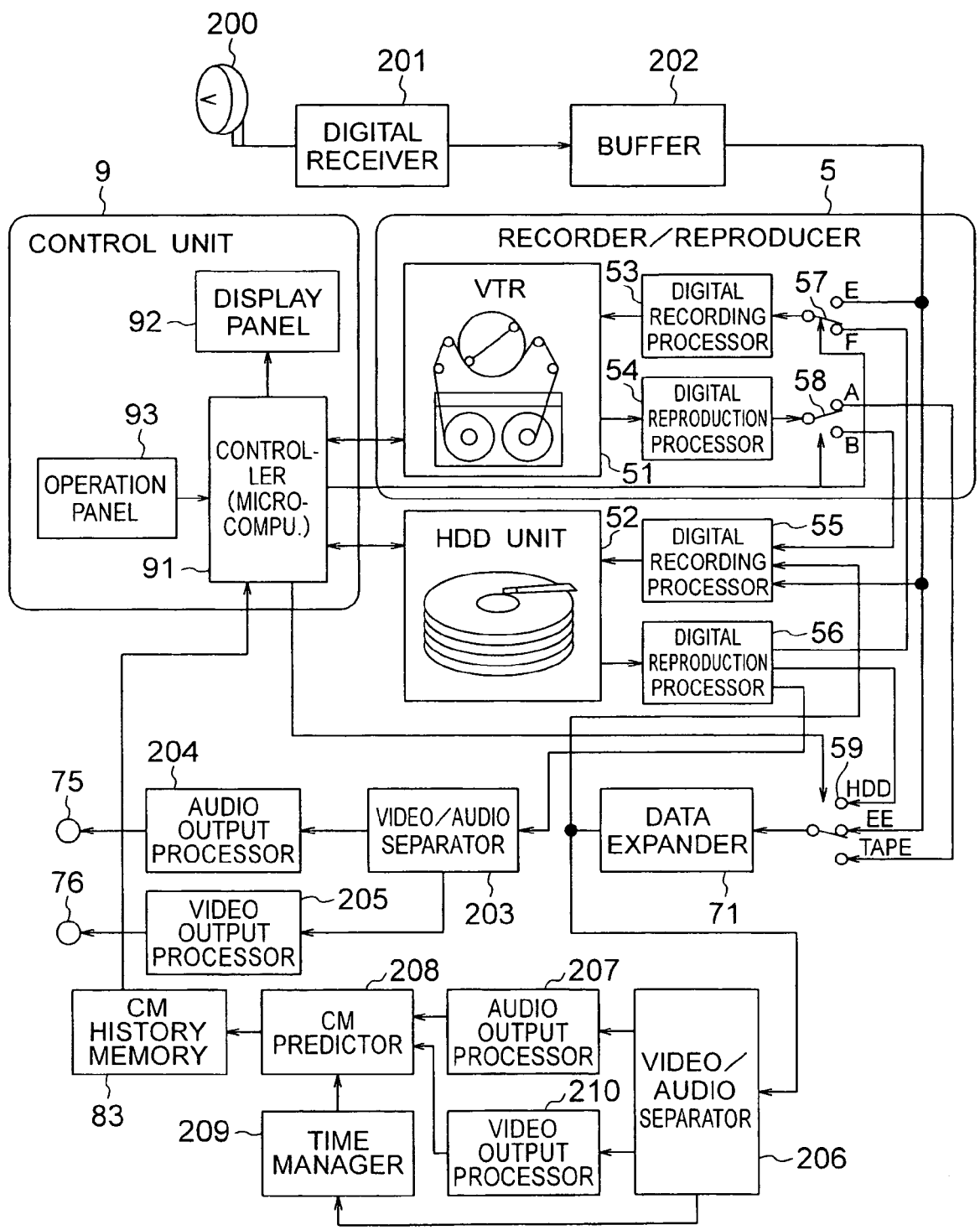
FIG. 15 is a block diagram of the construction of a digital recorder/reproducer to the third embodiment of the invention.

FIG. 15 shows a first example of this embodiment in which the prediction information of CM start and end points included in a digital broadcast signal is stored in the CM history memory at the time of recording, and the CMs are cut off, reproduced for quick seeing or fast forwarded at the time of reproduction.

In FIG. 15, like function blocks corresponding to those in FIG. 1 will not be described. A digital AV signal including a digital video signal, digital audio signal and information signal is selectively received by an antenna 200 and digital receiver 201 for receiving digital television broadcasts. A buffer 202, while buffering a predetermined amount of the digital AV signal, supplies the digital AV signal. The buffer stores the digital AV signal while the switching circuit 57 is in the contact F position.

The digital AV signal supplied from the buffer 202 is expanded by the data expander 71, and then separated into the digital video signal and the digital audio signal by the video/audio separator 206. The digital video signal is fed to the video output processor 210 where the variable points of the video signal are detected, and the detected results are supplied to the CM predictor 208. The digital audio signal is fed to the audio output processor 207 where silent pauses of a certain duration are detected, and the detected results are supplied to the CM predictor 208. The time manager 209 supplies to the CM predictor 208 time information for the measurement of reference time of CM. The CM predictor 208 predicts the CM start and end points, and supplies them to the CM history memory 83 where they are stored. The reproduction method using the CM history memory is the same as in the first example of the second embodiment, and hence will not be described here.

According to the first example of the third embodiment, the CMs of the digital broadcast signal can be cut off, reproduced for quick seeing or fast forwarded on the basis of the CMs predicted information previously stored in the CM history memory 83 at the time of recording, and therefore the user can view the program sections continuously so that the usability is excellent.

Figure 10:
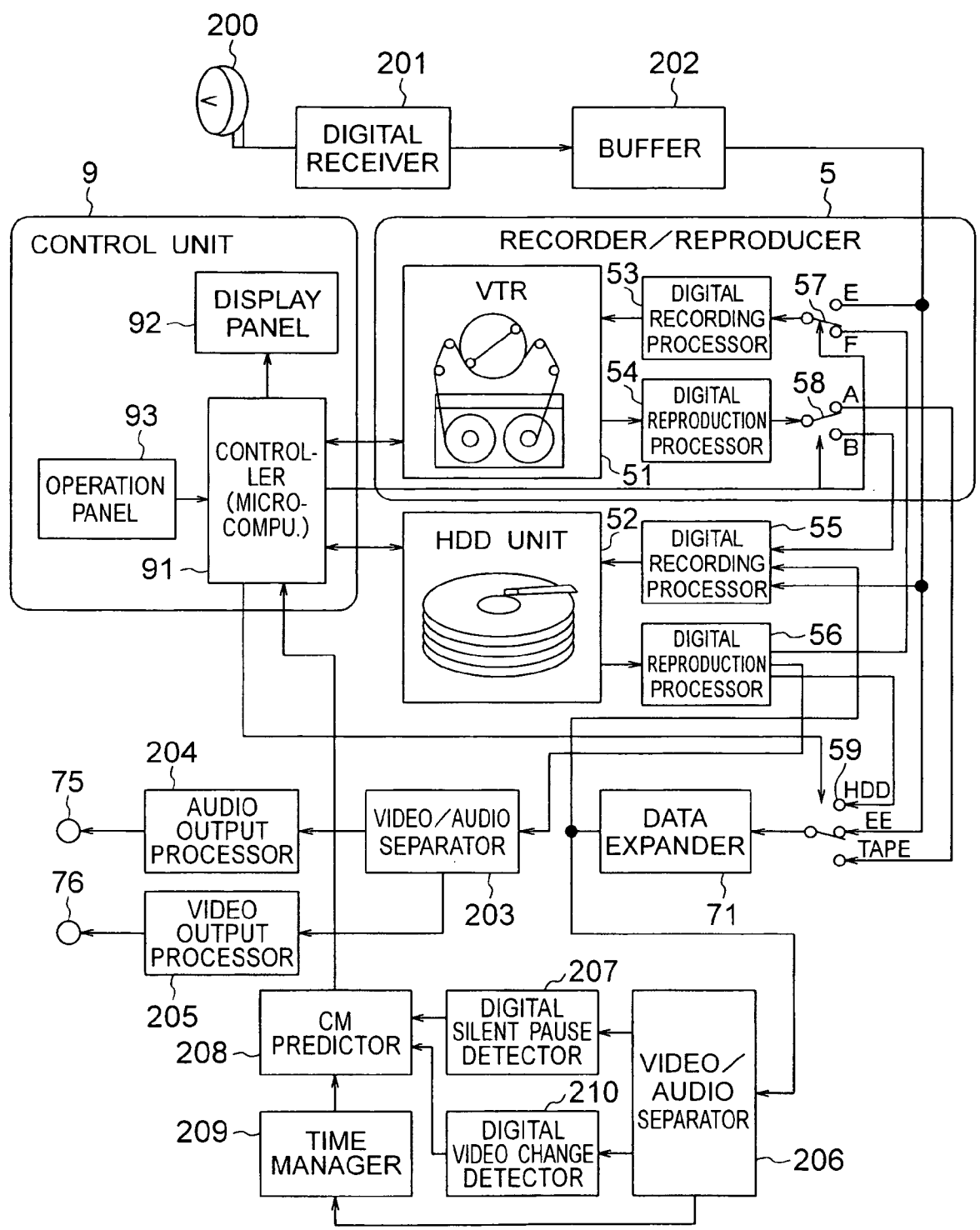
FIG. 10 is a block diagram of the construction of a digital recorder/reproducer according to the third embodiment of the invention.

The second example of the recorder/reproducer using the CM discrimination method will be described below. In the second example of the recorder/reproducer, at the time of reproduction, the CMs are predicted in real time from the signal that is reproduced from the recording medium on which a digital broadcast was recorded, and cut off, reproduced for quick seeing or fast forwarded. The second example is the same as in the imaging diagram of FIG. 18 in the second embodiment. The operation of this example will be described with reference to FIG. 10. In FIG. 10, like function blocks corresponding to those in FIG. 1 are identified by the same reference numerals and will not be described.

Referring to FIG. 10, the switching circuit 59 is in the Tape-side position, and the digital AV signal is reproduced by the VTR 51 and fed through the switching circuit 59 to the data expander 71. The expanded digital AV signal from the data expander 71 is supplied through the digital recording processor 55 to the HDD unit 52 where it is buffered for a predetermined period of time. The expanded digital AV signal is also predicted in its CMs by the CM predictor 208 in the same way as in the first example, and the CM predicted information is supplied to the controller 91. The controller 91 controls the HDD unit 52 to reproduce the buffered digital AV signal in accordance with the CM predicted information, so that the CMs can be cut off, reproduced for quick seeing or fast forwarded. In addition, the CMs of compressed digital signal itself can be cut off from that signal in the same way as in the second example of the second embodiment.

According to the second example of the third embodiment, when the recording medium having a digital broadcast signal recorded is reproduced, the CMs can be predicted in real time, and cut off, reproduced for quick seeing or fast forwarded. Thus, since the user can view the program sections continuously, the usability is excellent.

Figure 16:
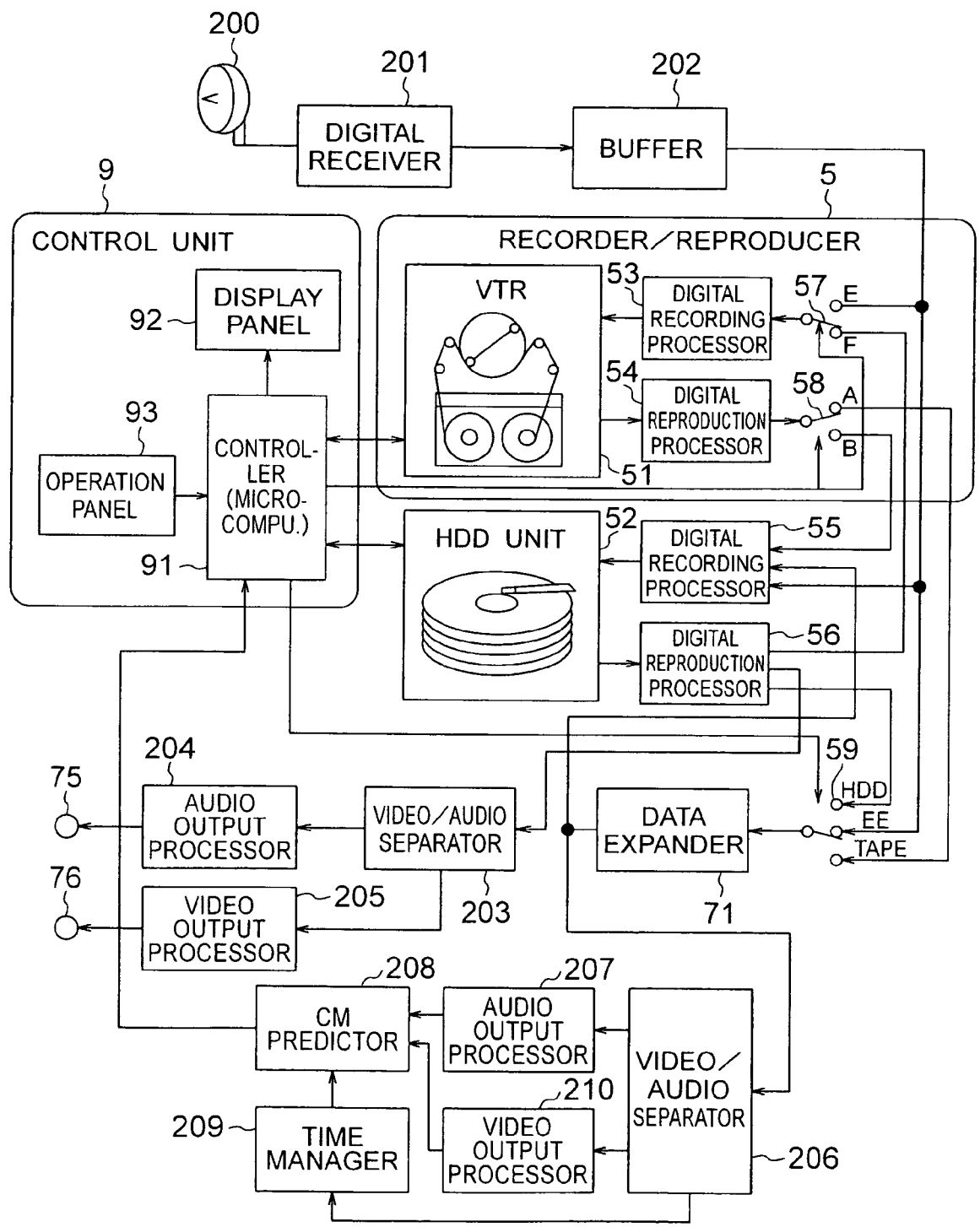
FIG. 16 is a block diagram of the construction of a digital recorder/reproducer to the third embodiment of the invention.

A third example using the CM prediction method will be described with reference to FIG. 16. The third example does not need a memory for always storing only the CM history information, such as the CM history memory, like the second example, but it is different from the second example in that the CMs are discriminated from the program at the time of recording the program.

The operation of this example will be described with reference to FIG. 16. In FIG. 16, like function blocks corresponding to those in FIG. 1 are identified by the same reference numerals, and will not be described.

The digital AV signal including the digital video signal, digital audio signal and information signal is selectively received by the antenna 200 and digital receiver 201 for receiving digital television broadcasts. The buffer 202, while buffering a predetermined amount of the digital AV signal, supplies the digital AV signal. The buffer continues to store the digital AV signal for the period in which the switching circuit 57 is in the contact F position.

The digital AV signal supplied from the buffer 202 is expanded by the data expander 71, and then separated into digital video and audio signals by the video/audio separator 206. The digital video signal is supplied to the video output processor 210 where the variable points of the video signal are detected, and then the detected results are fed to the CM predictor 208. The digital audio signal is fed to the audio output processor 207 where silent pauses of a predetermined time are detected, and the detected results are supplied to the CM predictor 208. The time manager 209 supplies time information for measuring reference time of CM to the CM predictor 208. The CM predictor 208 predicts the CM start and end points, and supplies the CM predicted information to the controller 91.

The controller 91 controls the VTR 51 to record on the magnetic tape the index signal indicating the CM start and end points. The index signal may be recorded on the tape in the longitudinal direction or on certain regions of the tape. In addition, the signal with the CMs cut off according to the CM predicted information can be recorded on the magnetic tape.

Moreover, while the magnetic tape is used in this embodiment, a disk-like recording medium such as magnetooptical disk or phase change optical disk may be used to record thereon the prediction information of CM start and end points at the time of recording.

Thus, according to the third embodiment of the invention, since the program itself of a digital television broadcast and the CM sections interposed in the program are discriminated, and cut off, reproduced for quick seeing or fast forwarded at the time of recording or reproduction, the effect is great.

As described above, in the reproduction method according to the third embodiment, the CMs can be removed (cut off, reproduced for quick seeing or fast forwarded) even at the time of receiving the digital broadcasts.

Fourth Embodiment

While in the second and third embodiments the CM discrimination means makes CM discrimination on the digital AV signal before being compressed, or on the compressed digital AV signal after expansion and conversion into the original video and audio signals, the CM discrimination on the compressed video and audio data before expansion can be performed in the following embodiment. This embodiment will be described with reference to FIG. 13.

Figure 13:
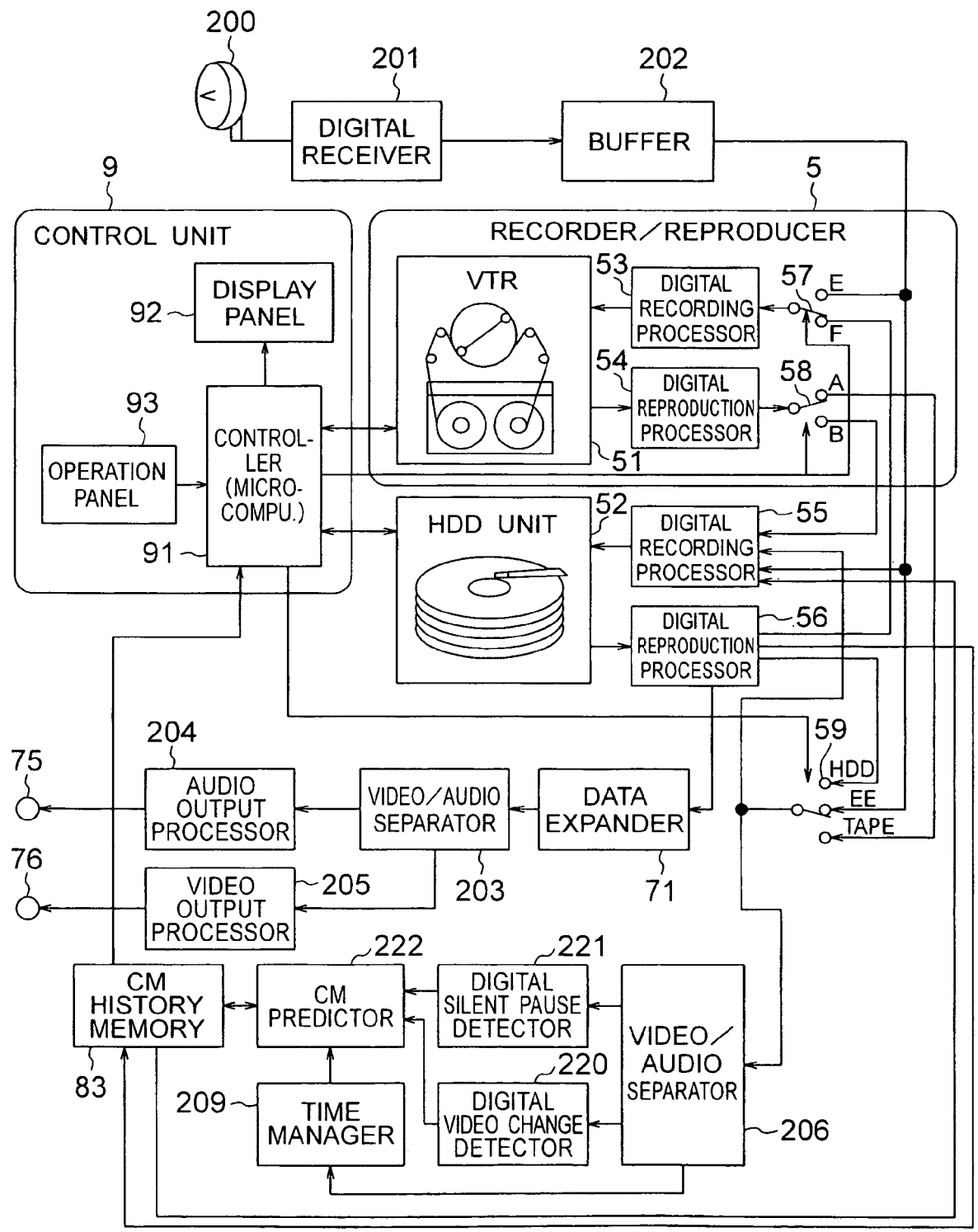
FIG. 13 is a block diagram of the construction of a digital recorder/reproducer according to the fourth embodiment of the invention.

In FIG. 13, like function blocks corresponding to those in FIG. 1 or FIG. 10 are identified by the same reference numerals, and will not be described.

Referring to FIG. 13, there are shown a digital video change detector 220 and a digital silent pause detector 221. The switching circuit 59 is in the contact HDD side position, and the digital AV signal is reproduced from the HDD unit 52 through the digital reproduction processor 56. The reproduced signal is separated into video and audio compressed digital signals by the video/audio separator 206. The video compressed digital signal includes scene change information when the video signal is compressed. When the scene change signal is a predetermined value or above, the corresponding frame is decided to be a video variable point, and the decided result is supplied to the CM predictor 81. The audio compressed digital signal is supplied to the silent pause detector 221 where the silent pauses are decided. Since the silent pause duration data of the audio digital signal can be compressed at a high rate, the silent periods of the audio compressed digital signal are discriminated from the other portions by considering that the amount of data compressed relative to real time is little. The above CM discrimination is made on the digital compressed AV signal read a predetermined time before it is supplied to the data expander 71 in the same way as in the previous embodiments.

The HDD unit 52 skips over the detected CM start and end points of the digital AV signal as described below. The digital AV signal is compressed for every certain period of the video signal, and this certain period is, for example, called GOP in the MPEG compression system. Therefore, by catching the digital AV data of GOPs from the compressed digital AV signal and using the real time data obtained from the GOPs, it is possible that the CM start and end points are cut off or reproduced for quick seeing.

The digital AV signal produced from the digital reproduction processor 56 is supplied to the video/audio separator 203 where it is separated into the digital video and audio signals. These video and audio digital signals are supplied to the video output processor 205 and audio output processor 204, respectively. The video output processor 205 and audio output processor 204 restore those signals into the original analog video and audio signals and supply them to the video and audio output terminals 76, 75, respectively.

As described above, the above operations are performed when the digital broadcast signal is received, and the CMs are discriminated from the program at the time of reproduction. Even in any one of the second and third embodiments, the CMs discrimination can be made on the video compressed data and audio compressed data as described above.

Thus, according to the fourth embodiment, the discrimination of CM start and end points from the program can be made on the digital AV signal at the time of reproduction. Since the CMs can be cut off or reproduced for quick seeing in real time reproduction by directly reading the digital AV signal and skipping over the CMs, the effect is great. In addition, since the compressed data is treated as it is, the load on the HDD unit can be reduced.

Fifth Embodiment

Figure 7:
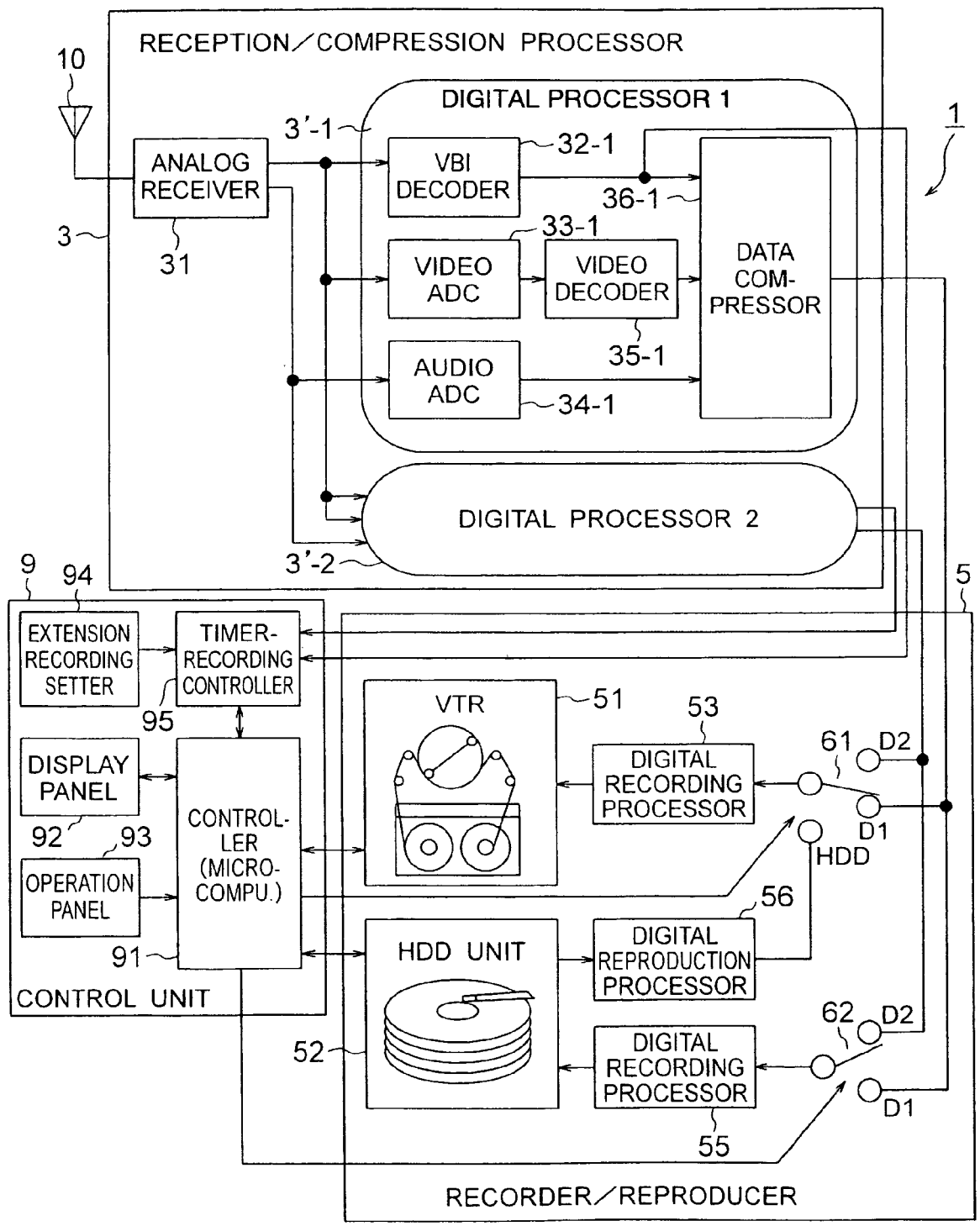
FIG. 7 is a block diagram of the construction of a digital recorder/reproducer according to the fifth embodiment of the invention.

The construction and operation of the digital recorder/reproducer 1 according to the fifth embodiment of the invention will be described with reference to FIG. 7. FIG. 7 is a block diagram of the construction of the digital recorder/reproducer according to this embodiment. In FIG. 7, the expansion/reproduction processing means 7 is not shown, and like elements corresponding to those in the first embodiment are identified by the same reference numerals, and will not be described in detail.

In the recorder/reproducer according to this embodiment, while a broadcast program is being recorded or timer-recorded under a timer control, and even if the broadcasting time of this program is extended beyond schedule, another broadcasting program of which the broadcasting time overlaps this program can be recorded or timer-recorded.

For this purpose, the construction is designed to additionally have a plurality of digital processors 3' with the analog receiver 31 of the reception/compression processor 3 left single, an extension recording setter 94 and a timer-recording controller 95.

The analog receiver 31 is able to receive a plurality of television broadcasts at a time, and supply the video and audio signals of each selected broadcast to the first digital processor 3'-1, second digital processor 3'-2.

Here, the digital processor 3' has the VBI decoder 32, the video ADC 33, the audio ADC 34, the video decoder 35 and the data compressor 36. The digital recorder/reproducer of this embodiment has a plurality of the digital processors (the first processor and second processor).

The digital compressed data of which the time base is compressed by the first and second digital processors 3'-1, 3'-2 are supplied to a switching circuit 61.

The operation of the digital recorder/reproducer of this embodiment will be described below.

Here, under the conditions that the recording of a program 1 from 9:00 p.m. to 9:54 p.m. is set on timer (timer-recording setting 1), and that the recording of a program 2 from 10:00 p.m. to 10:30 p.m. is set on timer (timer-recording setting 2), it is assumed that the program 1 is suddenly changed to extend 20 minutes long in its broadcasting time.

In addition to the above case, this embodiment can also handle the case in which any one or both of the programs are shifted in broadcasting time.

The user enters the timer-recording settings 1 and 2 through the operation panel 93. These timer setting information are supplied to the controller/microcomputer 91.

When the time of 9:00 p.m. comes, the switching circuit 61 is operated to change to the contact D1 position, allowing the compressed digital data (program 1) to be supplied from the digital processor 3'-1 to the digital recording processor 53, and the digital VTR 51 starts to record the program 1.

Two methods of making the setting for the time extension of the program 1 will be described below.

In the first method, the user enters the extension time of the program 1, thereby making it possible that the VTR 51 can continue the recording of program 1 up to the total time of the extension time and the previously entered end time of program 1.

The user enters the extension time or extended end time of program 1 through the extension recording setter 94. The extension time setting information is supplied to the timer-recording controller 95 so that the controller 91 controls the digital VTR 51 to continue the recording up to the extended end time.

In the second method, the extension time information or extended end time information of program 1 interfolded in the information signal is transmitted from the broadcast station to the digital recorder/reproducer, thus making the extended recording.

The information signal is decoded by the VBI decoder 32, and the extension time information or extended end time information of program 1 of the information signal is supplied to the timer-recording controller 95. The controller 91 controls the digital VTR 51 to record up to the extended end time on the basis of this extended end time information.

When the start time (10:00 p.m.) of program 2 comes under the condition that the program-1 extended recording operation is being executed, the switching circuit 62 is operated to change to the contact D2 position, allowing the compressed digital data (program 2) to be supplied from the digital processor 3'-2 to the digital recording processor 55, and the HDD unit 52 starts recording the program 2.

The recording of program 2 in the HDD unit 52 continues until the program 1 ends or until the program 2 ends.

When the recording of program 1 ends, the switching circuit 61 is operated to change to the HDD side position, allowing the VTR 51 to take a copy of the program 2 from the HDD unit 52. The compressed digital data of program 2 is reproduced from the HDD unit 52, and transferred through the digital reproduction processor means 56, switching circuit 61 and digital recording processor 53 to the digital VTR 51.

The controller 91 controls the switching circuits 61, 62, digital VTR 51 and HDD unit 52.

Thus, according to this embodiment, while a program is being recorded or timer-recorded, and even if this program is extended over schedule, another program of which the broadcasting time overlaps that of this program can be recorded or timer-recorded completely.

A modification of the fifth embodiment will be mentioned.

While one of a plurality of timer-set programs is suddenly extended in its broadcasting time in the fifth embodiment, the digital recorder/reproducer of this embodiment can be operated in a manner similar to the first embodiment by use of the fact that the data rate of digital VTR is larger than that of the data compressor, thereby recording a plurality of programs at a time on the same recording medium (magnetic tape).

Figure 8:
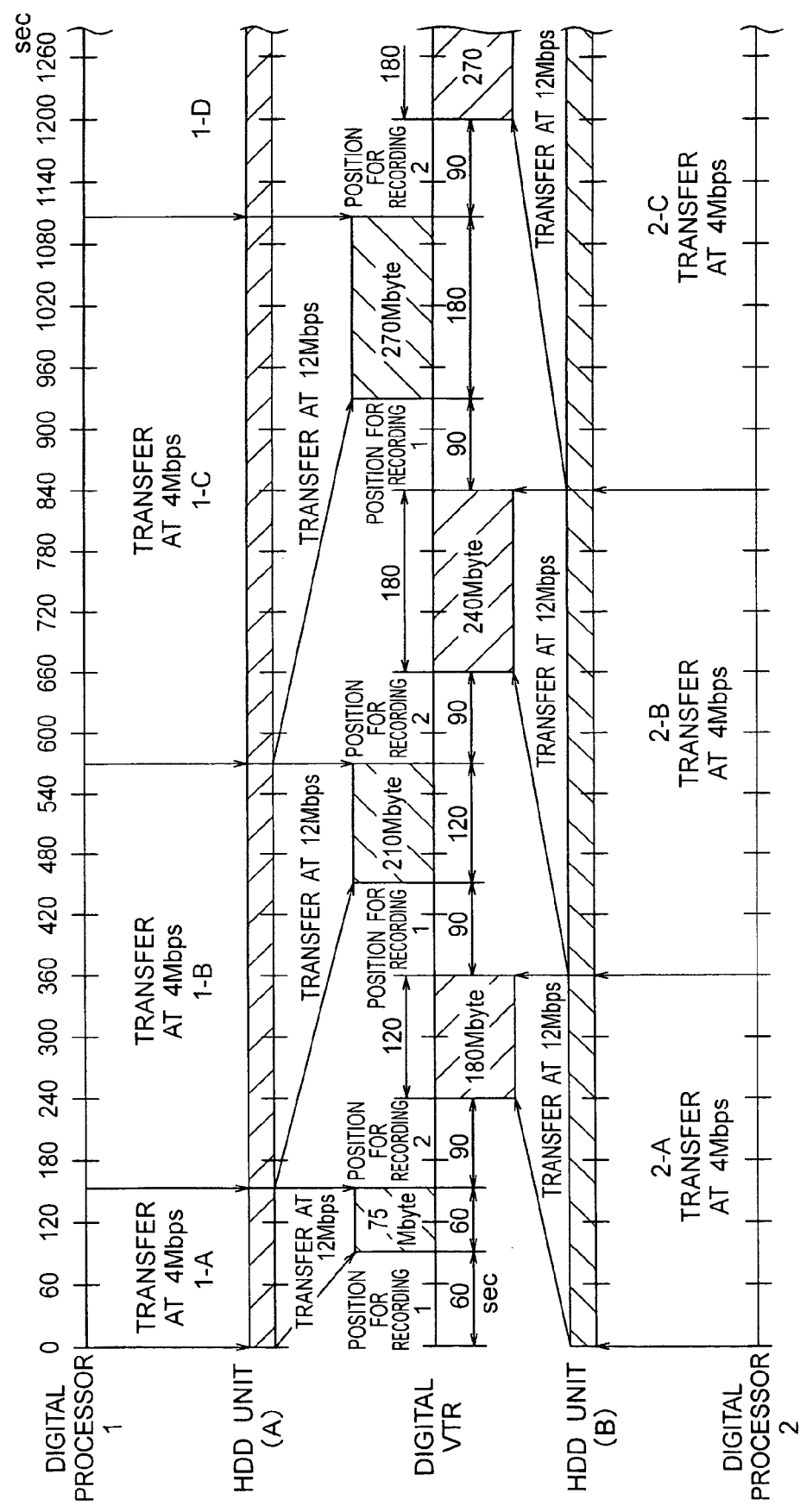
FIG. 8 is a diagram to which reference is made in explaining the state in which data is transferred in a modification of the fifth embodiment of the invention.

This recording operation will be described with reference to FIG. 8.

First, the recording start positions of a plurality of programs (programs 1 and 2) are previously fixed on a recording medium, the program 1 fed from the first digital processor 3'-1 is recorded on a first recording region A of the HDD unit 52, and the program 2 fed from the second digital processor 3'-2 recorded on a second recording region B of the HDD unit 52.

After the recording start position of program 1 is fixed, a certain amount of data (1-A) of program 1 accumulated in the first recording region A of HDD unit 52 is first transferred to and recorded in the digital VTR 51. In this case, since the time necessary to fix the start position is 90 seconds, and since the total amount of data transferred during the time taken to record is at most 75 Mbytes, the transfer time of 60 seconds will be enough.

During this time, data of program 1 (following 1-A) is continued to accumulate in the first recording region A, and similarly data of second program 2 is continued to accumulate in the second recording region B.

Then, after the recording position of program 2 is fixed, a predetermined amount of data (2-A) of program 2 accumulated in the second recording region B of HDD unit 52 is transferred to and recorded in the digital VTR 51. In this case, since the time necessary to fix the start position is 90 seconds, and since the total amount of data transferred during the time taken to record is at most 180 Mbytes, the transfer time of 120 seconds will be enough.

During this time, data of program 1 is continued to accumulate in the first recording region A, and similarly data of program 2 (following 2-A) is continued to accumulate in the second recording region B.

Moreover, after the recording position of program 1 is fixed at the last position of the previous recording, a certain amount of data (1-B) of program 1 accumulated in the first recording region A of HDD unit 52 is transferred to and recorded in the digital VTR 51. In this case, since the time necessary to fix the start position is 90 seconds, and since the total amount of data transferred during the time taken to record is at most 210 Mbytes, the transfer time of 120 seconds will be enough.

During this time, data of program 1 is continued to accumulate in the first recording region A, and similarly data of program 2 is continued to accumulate in the second recording region B.

Then, after the recording position of program 2 is fixed at the last position of the previous recording, a certain amount of data (2-B) of program 2 accumulated in the second recording region B of HDD unit 52 is transferred to and recorded in the digital VTR 51. In this case, since the time necessary to fix the recording position is 90 seconds, and since the total amount of data transferred during the time taken to record is at most 240 Mbytes, the transfer time of 180 seconds will be enough.

During this time, data of program 1 is continued to accumulate in the first recording region A, and similarly data of program 2 is continued to accumulate in the second recording region B.

In addition, after the recording position of program 1 is fixed at the last position of the previous recording, a certain amount of data (1-C) of program 1 accumulated in the first recording region A of HDD unit 52 is transferred to and recorded in the digital VTR 51. In this case, since the time necessary to fix the recording position is 90 seconds, and the total amount of data transferred during the time taken to record is at most 270 Mbytes, the transfer time of 180 seconds will be enough.

During this time, data of program 1 is continued to accumulate in the first recording region A, and similarly data of program 2 is continued to accumulate in the second recording region B.

After these operations are repeated, a plurality of programs can be recorded on the same recording medium at a time.

Sixth Embodiment

Figure 9:
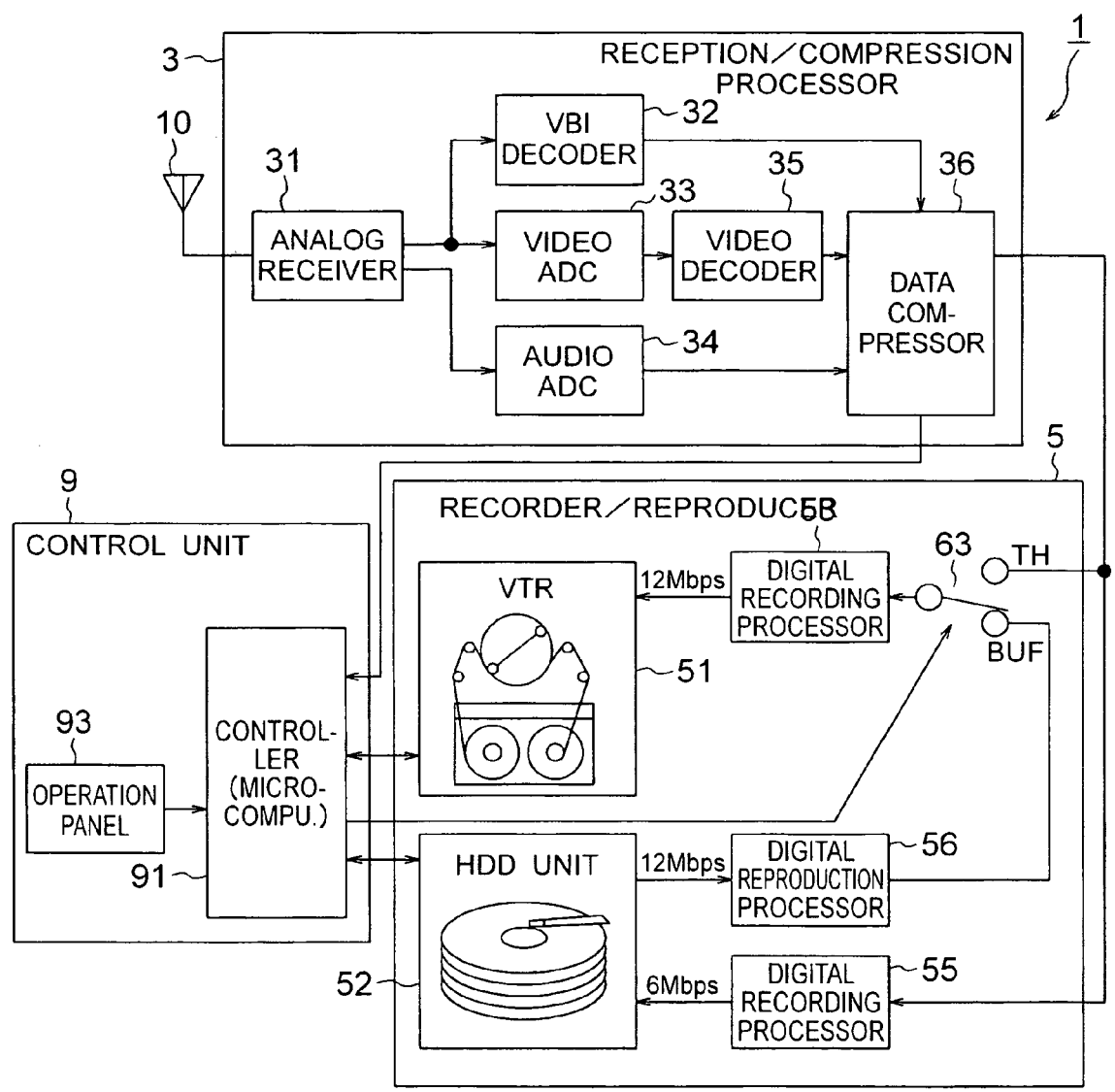
FIG. 9 is a block diagram of the construction of a digital recorder/reproducer according to the sixth embodiment of the invention.

The digital recorder/reproducer according to the sixth embodiment of the invention will be described with reference to FIG. 9. FIG. 9 is a block diagram of the construction of the digital recorder/reproducer of this embodiment. In FIG. 9, like elements corresponding to those in the first embodiment are identified by the same reference numerals, and will not be described in detail.

The digital recorder/reproducer of the fourth embodiment has the feature that when variable-rate compressed data is recorded, or when data of a data rate lower than to record in magnetic tape is recorded, a certain amount of data is recorded once in the HDD unit 52, and the data in the HDD unit 52 is copied into the magnetic tape.

First, variable rate compressed data by MPEG compression system as a typical example of video compression means will be described.

In the MPEG compression system, for example, video data is compressed to form three pieces of image information: intraframe coded information (I picture), interframe coded information predicted from the past (P picture), and interframe coded information predicted from the past and future (B picture). The unit of I picture, P picture and B picture each of which has a certain number of pictures is called GOP (Group Of Picture). The I picture, P picture and B picture are generated by use of the following compression means:

(1) Compression of information using spatial correlation (2) Compression of information using time-basis correlation (3) Compression of information using code appearance probability deviation occurring when information is coded by the above two compression means.

In the information compression using spatial correlation, one picture is divided into certain pixel blocks, and DCT (Discrete Cosine Transform) is made on each of the pixel blocks, thereby decomposing one picture into frequency components. After DCT, the coefficients of DCT are divided by a predetermined value, and the remainder is quantized by rounding.

Although the compression rate can be raised as the divisor is increased, the high frequency components of the video information are deleted, thus leading to the reduction of picture quality.

In the information compression using time-basis correlation, since the image information before and after the video image are almost similar, only the image change (motion vector) is employed as information so that the amount of video image transmission can be greatly reduced.

In the information compression using code appearance probability deviation, a short code length is assigned to the above DCT coefficients and motion vectors of high probability values, and a long code length to the low probability values, so that the average amount of information can be reduced. This operation is called the variable length coding.

Therefore, since the average, maximum and minimum data rates are, for example, 6 Mbps, 12 Mbps and 4 Mbps, respectively, the data rate is changed adaptively to the image of the video source.

For the sake of explanation, it is assumed that the average data rate of the compressed digital data generated by the variable rate data compression is 6 Mbps and that the recording/reproduction data rate of the digital VTR 51 is 12 Mbps.

The data compressor 36 sends the current compression rate to the controller 91. The controller 91, when recognizing that the compression rate is lower than or higher than the recording/reproduction data rate (12 Mbps) of the digital VTR 51, controls the digital VTR 51 to stop from recording operation, and the HDD unit 52 to start recording the compressed digital data (6 Mbps).

The HDD unit 52, when having stored a certain amount of the compressed digital data, starts to reproduce the recorded certain amount of compressed digital data while the compressed digital data (6 Mbps) is still continued to record.

The reproduced compressed digital data is supplied through the digital reproduction processor means 56, switching circuit 63 and digital recording processor 53 to the digital VTR 51 where it is recorded.

When the recorded certain amount of compressed digital data is completely reproduced, the digital VTR 51 is stopped from recording.

The switching circuit 63 is operated to change to the contact BUF side position when the above intermittent recording is performed, and it is operated to change to the contact TH side position when normal recording is made. The controller 91 controls the switching circuit 63 to change the positions.

While the compressed digital data is recorded at a variable data rate in the sixth embodiment, the data rate may be a lower or higher fixed rate than the recording/reproduction rate of the digital VTR.

By using the HDD unit 52 as data buffer so that the digital VTR 51 intermittently records every certain amounts of data, it is possible to apparently change the data recording rate of the digital VTR 51, and thus to effectively use the magnetic tape.

The compression generation means and expansion generation means in this embodiment may be based on other systems such as MPEG-1, MPEG-2 or JPEG.

While HDD is used as a disk-like recording medium as above, the disk-like recording medium may be other recording media such as magnetooptical disk, phase change optical disk or semiconductor memory.

While the television broadcast receiving system chiefly for receiving analog television broadcasts has been described in this specification, the present invention can of course be used for receiving digital television broadcasts.

Moreover, the HDD unit 52 may be incorporated in a personal computer separated from the VTR, and connected thereto through IEEE 1394 bus or the like. Similarly, the controller may be an external apparatus such as a personal computer, separated from the VTR.

It should be understood that the above embodiments are given for explaining the present invention and do not restrict or narrow the scope of the invention.

The construction of each part of the invention is not limited to those in the above embodiments, but may be of course changed in various ways within the technical scopes of the claims of the invention.

The second recording medium in the present invention may be a recording medium capable of simultaneously recording and reproducing. The recording and reproduction that are made at a time may be performed in a time-sharing manner.

As described above, the recorder/reproducer according to the invention can be used together with a recording medium such as HDD when the recording medium such as magnetic tape is recorded or reproduced, thus making it possible to operate in parallel with other processing so that the usability can be improved.

Particularly when the digital recorder/reproducer is used, the recorded program can be reproduced while the television signal is being recorded in the digital recorder/reproducer.

Moreover, according to the invention, the beginning end of the recorded program on the magnetic tape can be apparently instantly brought to be ready to reproduce.

Also, according to the invention, the recorded portion of a program under recording can be reproduced from any position while the program is being recorded.

According to the invention, a television broadcast program and CMs interposed between the program sections of the program are discriminated at the time of recording or reproduction, and the CMs are removed at the time of reproduction so that only the program itself can be viewed.

According to the invention, while a program is being recorded or timer-recorded, and even if this program is suddenly extended over its scheduled end time, another program of which the broadcasting time overlaps that of this program can be recorded or timer-recorded.

According to the invention, HDD is used as data buffer, and the digital VTR is operated to intermittently record every certain amounts of data fed from the HDD, thereby making it possible that the data recording rate of the digital VTR 51 can be apparently changed to effectively use the magnetic tape.

According to the invention, even when a magnetic disk, magnetooptical disk, phase change optical disk or semiconductor memory is used instead of the magnetic tape, and even when a magnetic disk, magneto-optical disk, phase change optical disk or semiconductor memory is used instead of HDD, the same effect as above can be obtained.

In addition, according to the invention, a plurality of input signals can be recorded at different regions on the same recording medium on which a signal is continuously recorded by a VTR.

INDUSTRIAL APPLICABILITY

The recorder/reproducer of the present invention, while recording or reproducing on a recording medium, can make other processing, and thus the usability can be enhanced. Particularly digital signals can be processed.

What is claimed is:

1. A recorder/reproducer for recording and reproducing signals, comprising:
    a receiver which receives signals;
    a first recorder which records the signals received by the receiver on a first recording medium;
    a first reproducer which reproduces the signals recorded on the first recording medium;
    a second recorder which records the signals reproduced by the first reproducer on a second recording medium which enables random access without requiring recording of positional information of a commercial message portion;
    a detector which detects the commercial message portion from the signals recorded on the second recording medium; and
    a second reproducer which reproduces the signals recorded on the second recording medium while excluding the commercial message portion detected by the detector and which combines a plurality of parts of the signals which differ from the excluded commercial message portion while the signals are reproduced from the first recording medium.

2. The recorder/reproducer according to claim 1, wherein a capacity of the second recording medium is larger than a capacity of the first recording medium and an access speed of the second recording medium is faster than an access speed of the first recording medium.

3. The recorder/reproducer according to claim 1, wherein the received signals include audio signals, and the detector discriminates a portion wherein an audio signal is a stereo signal as a commercial message portion.

4. The recorder/reproducer according to claim 1, wherein the detector discriminates a portion as a commercial message portion if intervals between changing points of the received signals correspond to a certain time interval, and occur continuously for a certain time.

5. The recorder/reproducer according to claim 4, wherein the received signals include video signals and audio signals, and the changing point is a point at which a video signal level drastically changes and an audio signal level is close to zero.

6. A recorder/reproducer for recording and reproducing signals, comprising:
   a receiver which receives signals;
   a detector which detects a commercial message portion from the signals received by the receiver;
   a first recorder which records the signals and CM information indicating a location of the detected commercial message portion on a first recording medium;
   a first reproducer which reproduces the signals recorded on the first recording medium;
   a second recorder which records the signals reproduced by the first reproducer on a second recording medium which enables random access without requiring recording of positional information of the commercial message portion; and
   a second reproducer which reproduces the signals recorded on the second recording medium while jumping over the commercial message portion and which combines a plurality of parts of the signals which differ from the jumped over commercial message portion.

* * * * *

UNITED STATES PATENT AND TRADEMARK OFFICE
CERTIFICATE OF CORRECTION

PATENT NO.         : 7,457,513 B2
APPLICATION NO.    : 11/124234
DATED              : November 25, 2008
INVENTOR(S)        : Fujita et al.

It is certified that error appears in the above-identified patent and that said Letters Patent is hereby corrected as shown below:

Title page insert
--(30)  Foreign Application Priority Data

April 27, 1998  (JP)    10-117253--

Signed and Sealed this

Third Day of March, 2009

JOHN DOLL
*Acting Director of the United States Patent and Trademark Office*